United States Patent [19]
Takata et al.

[11] Patent Number: 5,343,238
[45] Date of Patent: Aug. 30, 1994

[54] WIDE-SCREEN TELEVISION RECEIVER WITH ASPECT RATIO CONVERSION FUNCTION AND METHOD OF DISPLAYING A RANGE TO BE MAGNIFIED AND DISPLAYED

[75] Inventors: Haruki Takata, Chigasaki; Kenji Katsumata, Yokohama; Shigeru Hirahata, Yokohama; Mituo Konno, Yokohama; Kouichi Ishibashi, Chigasaki; Sunao Suzuki, Fujisawa, all of Japan

[73] Assignees: Hitachi, Ltd., Tokyo; Hitachi Video Information System, Inc., Yokohama, both of Japan

[21] Appl. No.: 886,856

[22] Filed: May 22, 1992

[30] Foreign Application Priority Data

| May 23, 1991 | [JP] | Japan | 3-146491 |
| May 23, 1991 | [JP] | Japan | 3-146492 |
| Aug. 30, 1991 | [JP] | Japan | 3-244185 |

[51] Int. Cl.$^5$ .......................... H04N 5/44; H04N 5/46
[52] U.S. Cl. ......................... 348/556; 348/561
[58] Field of Search ............... 358/180, 140, 11, 22, 358/230, 183, 22, 188; 348/556, 554, 561, 581, 553, 445, 448, 458; H04N 5/46, 7/01, 3/27, 5/46, 5/44

[56] References Cited

U.S. PATENT DOCUMENTS

| 4,528,585 | 7/1985 | Bolger | 358/22 |
| 5,029,006 | 7/1991 | Katsumata et al. | 358/180 |
| 5,107,334 | 4/1992 | Matsumoto | 358/180 |
| 5,119,082 | 6/1992 | Lumelsky et al. | 358/140 X |
| 5,153,728 | 10/1992 | Nakayama et al. | 358/180 |
| 5,159,438 | 10/1992 | Rabii | 358/180 X |
| 5,172,103 | 12/1992 | Kita | 358/22 X |
| 5,181,110 | 1/1993 | Katsumata et al. | 358/140 |
| 5,220,423 | 6/1993 | Chikuma | 358/140 |
| 5,233,422 | 8/1993 | Kondo et al. | 358/180 |
| 5,243,421 | 9/1993 | Nagata et al. | 358/140 |

FOREIGN PATENT DOCUMENTS

| 0298362 | 1/1989 | European Pat. Off. | H04N 5/44 |
| 0514819 | 11/1992 | European Pat. Off. | H04N 5/44 |
| 60-165883 | 8/1985 | Japan | H04N 7/01 |
| 63-026174 | 2/1988 | Japan | H04N 5/46 |
| 1046377 | 2/1989 | Japan | H04N 5/262 |
| 1-194783 | 8/1989 | Japan | H04N 7/01 |
| 2121571 | 5/1990 | Japan | H04N 5/00 |
| 3011891 | 1/1991 | Japan | H04N 7/01 |
| 4192694 | 7/1992 | Japan | H04N 7/01 |

OTHER PUBLICATIONS

GB 2,251,755A, Jul. 1992, Richards.

*Primary Examiner*—James J. Groody
*Assistant Examiner*—Safet Metjahic
*Attorney, Agent, or Firm*—Antonelli, Terry, Stout & Kraus

[57] ABSTRACT

A wide-screen television receiver capable of converting a TV signal of a non-aspect ratio into a signal of a wide aspect ratio which can be displayed on a wide screen of the wide aspect ratio and previously visually informing the user of what part of the image of the non-aspect ratio TV signal is converted in its aspect ratio and displayed on the wide screen. The receiver includes the interpolation scan speed conversion circuit, the mode setting circuit, the aspect ratio converting circuit, the wide cursor adding circuit and the wide display. The interpolation scan speed conversion circuit makes a series of processes such as Y/C separation and scan line interpolation for the input video signal supplied via the input terminal. The aspect ratio converting circuit compresses the video signal from the interpolation scan speed conversion circuit in the horizontal direction by use of a memory. The magnification processing circuit is provided after the aspect ratio converting circuit. This magnification processing circuit magnifies the horizontally compressed video signal so that an arbitrary part of image specified by the mode setting circuit can be magnified at given magnification powers in the horizontal and vertical direction. The wide screen display displays the magnified image of the video signal without horizontal and vertical distortions on the wide screen.

22 Claims, 22 Drawing Sheets

FIG. 23

| | | | | |
|---|---|---|---|---|
| (A) | (Z) STOP | (Y) STOP | (Z) | $1 \cdot Z + 0$ |
| (B) | (A) | (Z) | (Z) | $\frac{6}{8} \cdot A + \frac{2}{8} \cdot Z$ |
| (C) | (B) | (A) | (A) | $\frac{3}{8} \cdot B + \frac{5}{8} \cdot A$ |
| (D) | (C) STOP | (B) STOP | (B) | $\frac{1}{8} \cdot C + \frac{7}{8} \cdot B$ |
| (E) | (C) | (B) | (C) | $\frac{7}{8} \cdot C + \frac{1}{8} \cdot B$ |
| (F) | (D) | (C) | (C) | $\frac{5}{8} \cdot D + \frac{3}{8} \cdot C$ |
| (G) | (E) STOP | (D) STOP | (D) | $\frac{2}{8} \cdot E + \frac{6}{8} \cdot D$ |
| (H) | (E) | (D) | (E) | $1 \cdot E + 0$ |
| (a) | (b) | (c) | (d) | (e) |

FIG. 26A
FIG. 26B
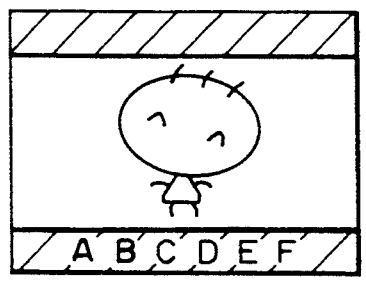
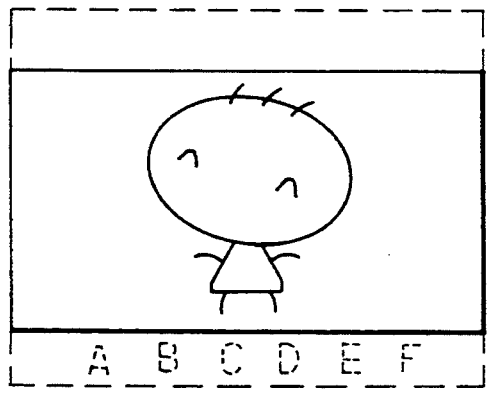
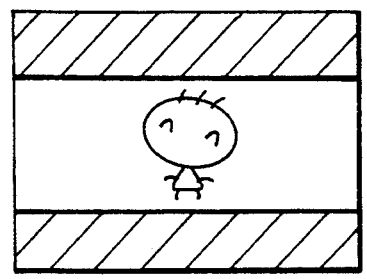
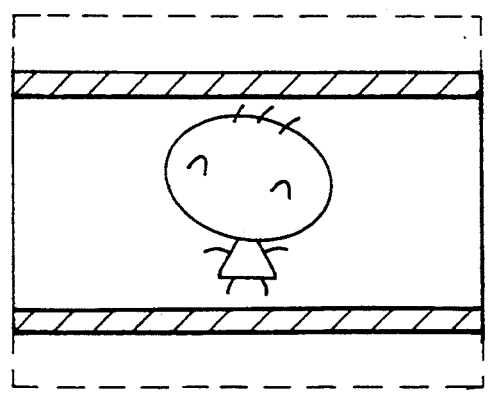

WIDE-SCREEN TELEVISION RECEIVER WITH ASPECT RATIO CONVERSION FUNCTION AND METHOD OF DISPLAYING A RANGE TO BE MAGNIFIED AND DISPLAYED

CROSS-REFERENCE TO RELATED APPLICATIONS

This application relates to U.S. patent applications Ser. No. 343,495 filed Apr. 25, 1989 (now U.S. Pat. No. 5,029,006), Ser. No. 07/634,518 filed Dec. 27, 1990 which is a continuation application of Ser. No. 343,495, Ser. No. 07/552,559 filed Jul. 16, 1990, Ser. No. 07/644,888 filed Jan. 23, 1991 and Ser. No. 07/772,162 field Oct. 7, 1991.

BACKGROUND OF THE INVENTION

This invention relates to a wide-screen television receiver.

That is, if a video signal having a non-wide aspect ratio (for example, 4:3) is received by a television receiver and displayed directly on a wide-screen of an aspect ratio (for example, 16:9), the image of the video signal will be distorted in the lateral direction on the display screen. Thus, in this case, if this video signal is converted into a video signal of a proper aspect ratio before it is displayed on the screen, the video signal of a non-wide aspect ratio can be normally displayed without distortion on the wide screen of a wide aspect ratio. This invention relates to this wide-screen television receiver.

In addition, this invention relates to another wide-screen television receiver having a wide-screen display and capable of enlarging an arbitrary portion of a video image in the horizontal and vertical directions at given magnifications and displaying it on the screen.

Recently, as the television receiver becomes large-sized, it is absolutely necessary to improve the picture quality of the displayed video image. Thus, various high-definition television systems have been proposed and are being practically used. There are known the second-generation EDTV (Extended Definition TV) which has the same number of scan lines and field frequency as those of the present television system (NTSC) and a wide aspect ratio (16:9) for increasing the realism, and the HDTV (High Definition TV) which has a different number of scan frequency and a different field frequency from those of the present television system and which has a wide aspect ratio (16:9). The first-generation EDTV has a non-wide aspect ratio (4:3) as in the prior art.

In the future, the HDTV will be supposed to prevail over the other systems, and at the same time the HDTV system and the present television system which have different aspect ratios will be expected to coexist for a while. Therefore, the future television receiver will have a wide-screen display of aspect ratio, 16:9.

Thus, the video signal of aspect ratio 4:3 used at present is necessary to be displayed on a wide-screen display of aspect ratio 16:9. The displaying method is disclosed in, for example, JP-A-1-194783.

According to JP-A-1-194783, when a video signal of aspect ratio 4:3 as shown in FIG. 25A (a1) is received and directly displayed on a wide screen of aspect ratio 16:9, it is displayed to be long in the horizontal direction as shown in FIG. 25A (a2). Thus, the video signal is compressed in the horizontal direction by use of a memory and displayed together with additional left and right frames as shown in FIG. 25A (a3) or it is magnified and displayed with upper and lower parts cut off on the wide screen of aspect ratio 16:9.

Moreover, when a lateral-long video signal with blanks inserted such as movie software is received, compressed in the horizontal direction and displayed, it becomes small at the central area on the wide screen of aspect ratio 16:9 as shown in FIG. 25B (b2). Thus, the utilization efficiency of the screen is poor and the realism is lost. Therefore, the lateral-long image is magnified up to the upper and lower limits of the wide screen of aspect ratio 16:9 and displayed thereon as shown in FIG. 25B (b3).

Thus, the wide-screen television receiver having a wide-screen display is able to receive not only the wide video signal of aspect ratio 16:9 but also the non-wide video signal of aspect ratio 4:3, and convert the non-wide aspect ratio into a ratio suitable for the wide-screen display so that the video signals of different aspect ratios can be displayed with no distortion.

In addition, when the input video signal is laterally long with a blank inserted on the upper and lower sides as is the movie software video, the video portion is magnified by the above-mentioned method so as to be displayed all over the wide screen. Thus, the video signal is processed by various ways so that it can be displayed with realism over the entire area of the wide screen.

SUMMARY OF THE INVENTION

However, video movie software cassettes of various image sizes are now supplied to the market and thus can not be fully processed only by the display modes shown in FIG. 25B at b3 and FIG. 25A at a3 and a4.

FIGS. 26A and 26B show other possible examples for displaying on the wide-screen display. As illustrated in FIG. 26A, if an input video signal with a superimposed dialogue inserted on the blank is magnified by the above method, the dialogue portion disappears from the wide screen. Also, as illustrated in FIG. 26B, if an input video signal with large upper and lower blank regions is similarly magnified by the above method, part of the blank regions remains on the upper and lower sides of the wide screen.

To solve this problem, the number and locations of the regions to be magnified are, respectively, arbitrarily increased and changed as disclosed in JP-A-3-11891. This requires many magnifying circuits of which the number corresponds to that of the regions to be magnified. Consequently, the circuit scale is also increased with the increase of the regions to be magnified, thus increasing the cost. In addition, the magnifying power to be specified is limited to (N+1)/N.

In view of the above-given problems, it is an object of the invention to provide a wide-screen television receiver having a wide-screen display, and which is capable of selecting arbitrary values of the magnifying power when a video signal of a non-wide aspect ratio is magnified and displayed on the wide screen.

It is another object of the invention to provide a wide-screen television receiver having such a new function that when a part of the image of an input video signal is magnified and displayed as a wide aspect ratio image, the user can be visually informed, beforehand, of where that part of the image is located on the entire image of the input video signal.

It is still another object of the invention to provide a wide-screen television receiver having a limited circuit for magnifying an arbitrary region of the image of a video signal with various different sizes such as movie video software, at given values of magnifying power so that the video signal can be displayed over the entire area of the wide screen with high quality.

According to the invention, for the first-mentioned object there is provided a television receiver which has mode setting means for setting a display mode, aspect ratio converting means which is set to one of a plurality of conversion modes or display magnification modes in accordance with the output signal from the mode setting means and which converts a video signal of a non-wide aspect ratio into a signal of a wide aspect ratio suitable for being displayed on a wide aspect ratio screen by converting the time-axis of the video signal in accordance with the aspect ratio of the screen and magnifying the time-axis converted video signal in accordance with a part to be displayed of the video signal, and a wide display of the wide aspect ratio for displaying the output signal from the aspect ratio converting means.

According to another aspect of the invention, for the second-mentioned object there is provided a television receiver which has mode setting means for setting a display mode, aspect ratio converting means which is set to one of a plurality of conversion modes or display magnification modes in accordance with the output signal from the mode setting means and which converts a video signal of a non-wide aspect ratio into a signal of a wide aspect ratio suitable for being displayed on a screen of a wide aspect ratio, a wide cursor adding circuit which is supplied with the video signal from the aspect ratio converting means and produces a video signal with a cursor by which a part of image to be magnified and displayed as a wide aspect ratio image is selected from the displayed image in accordance with the conversion mode set by the mode setting circuit, and a wide display of the wide aspect ratio for displaying the output video signal from the wide cursor adding circuit.

According to another aspect of the invention, for the last-mentioned object there is provided a television receiver which has aspect ratio converting means for converting the aspect ratio of an input video signal into a signal of a wide aspect ratio suitable for being displayed on a wide screen display, vertical magnification means for respectively multiplying two vertically adjacent pixels of the input video signal by approximate coefficients of $N/2^n$ and $1-N/2^n$ ($n$ is a positive integer, and $0 \div N \leq 2^n$) and adding the products to produce interpolation pixels for vertical magnification, horizontal magnification means for respectively multiplying two horizontally adjacent pixels by approximate coefficients of $N/2^n$ and $1-N/2^n$ and adding the products to produce interpolation pixels for horizontal magnification, mode setting means for specifying a part of image to be magnified and setting arbitrary magnification powers of various different magnifications including the magnification necessary for interpolation pixels which cannot be produced by the coefficients of $N/2^n$ and $1-N/2^n$ and the other magnification than $(N+1)/N$ times, and the wide screen display.

The aspect ratio converting means compresses the video signal of a non-wide aspect ratio in the horizontal direction by use of a memory in order that it can be displayed on the wide screen without any distortion.

The vertical magnification means multiplies two vertically adjacent pixels by coefficients of $N/2^n$ and $1-N/2^n$ and adds the products to produce new vertical pixels. The horizontal magnification means multiplies two horizontally adjacent pixels by coefficients of $N/2^n$ and $1-N/2^n$ and adds the products to produce new horizontal pixels. At this time, even if pixels to be interpolated for a specified magnification are at locations which cannot be expressed by the coefficients of $N/2^n$ and $1-N/2^n$, interpolation is made by using approximate values of the coefficients of $N/2^n$ and $1-N/2^n$. Since the image has a strong vertical and horizontal correlation, a high quality magnified image can be displayed even by using approximate values of the coefficients.

BRIEF DESCRIPTION OF THE DRAWINGS

FIG. 23 is a diagram showing interpolation scan lines for magnification of 7/5;

FIGS. 26A and 26B show examples of displaying an image at a magnification of 4/3 on the wide screen in the prior art;

DESCRIPTION OF THE PREFERRED EMBODIMENTS

Figure 1:
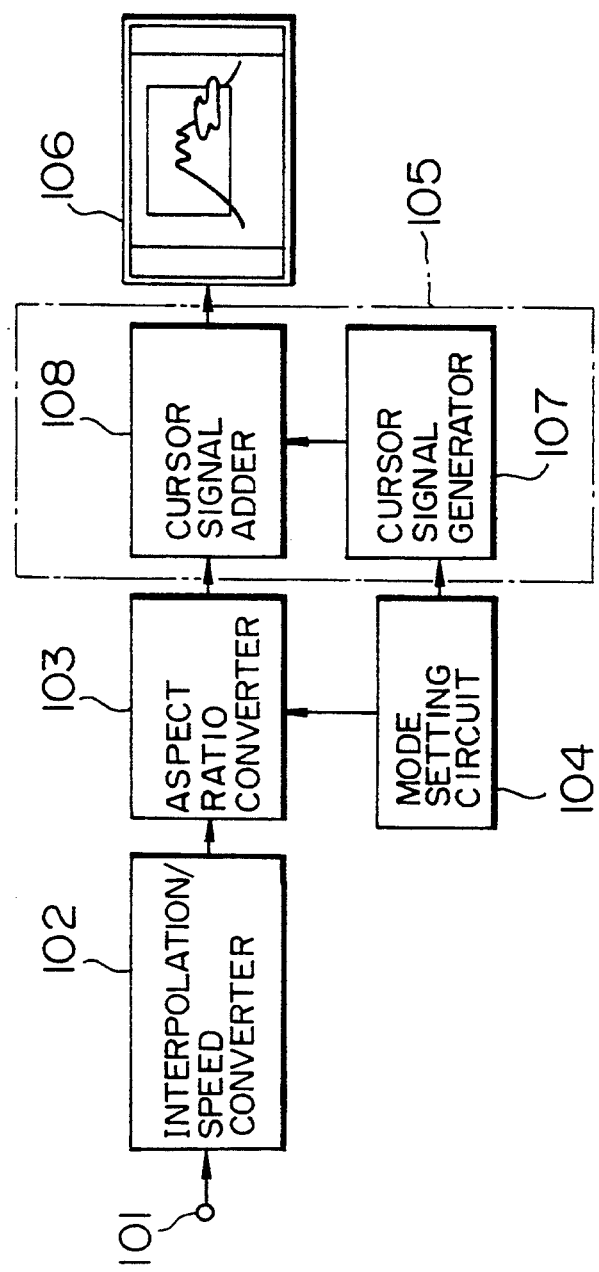
FIG. 1 is a block diagram of one embodiment of the invention.
Figure 2:
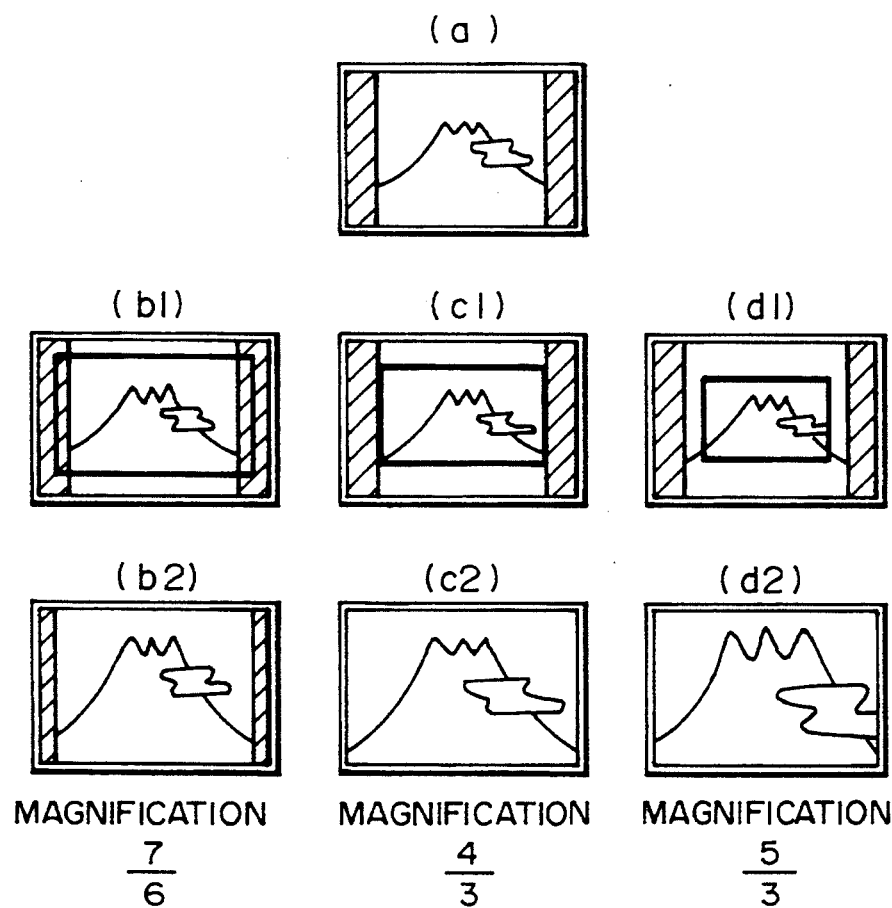
FIG. 2 is a diagram to which reference is made in explaining examples of display modes in which a video signal is displayed on the screen according to this invention.

FIG. 1 is a block diagram of the construction of one embodiment of the invention. FIG. 2 is a diagram showing display modes in which an image is displayed on a display screen according to this invention. Referring to FIG. 1, there are shown an input terminal 101 for a digitized video signal, an interpolation/scan speed conversion processing circuit 102 for producing a scan-speed converted video signal having a scan speed twice the normal scan speed by processing the input video signal in a manner appropriate to the input video signal, and an aspect ratio converting circuit 103 for converting the aspect ratio of the signal from the interpolation/scan speed conversion processing circuit 102 into a wide aspect ratio. In addition, there are shown a mode setting circuit 104 for setting the converting mode of the aspect ratio converting circuit 103, a wide cursor adding circuit 105 for adding a wide cursor to the output signal from the aspect ratio converting circuit 103, and a display 106 having a laterally long screen of, for example, aspect ratio (16:9). The wide cursor adding circuit 105 has a cursor signal generating circuit 107 and a cursor signal superimposing circuit 108.

In this embodiment, the input video signal is first supposed to be an NTSC signal having a non-wide aspect ratio (4:3). The digitized input video signal to the input terminal 101 is supplied to the interpolation/scan speed conversion circuit 102, which makes the signal processing for this input video signal and produces a doubled-scan speed video signal.

This interpolation/scan speed conversion processing circuit 102, when supplied with a normal NTSC signal whose video signal portion has a non-wide aspect ratio (4:3) or supplied with an NTSC signal whose video signal portion is laterally long with a blank inserted on the upper and lower sides as in video movie software, makes such processing as Y/C separation, scan line interpolation (for producing a scan line signal from the input video signal) or scan speed conversion (for converting the interlaced video signal into a non-interlaced video signal, or for progressive scan), and produces a doubled scan speed, or non-interlaced video signal. When the input signal is a second generation EDTV signal, it makes such processing as widening or high-definition information addition, and then makes scan speed conversion.

The video signal, such as, for example, luminance signal and color difference signals from the interpolation/scan speed conversion circuit 102 is supplied to the aspect ratio converting circuit 103. In this embodiment, since the display 106 has a laterally long screen of aspect ratio (16:9), the video signal of aspect ratio (4:3) should be compressed in the horizontal direction and displayed as shown in FIG. 2 at (a) or it should be magnified in the horizontal and vertical directions, partially cut away in its upper and lower sides for matching the aspect ratio with the display and displayed as shown in FIG. 2 at (b2), (c2) and (d2). The aspect ratio converting circuit 103 makes this horizontal compression or horizontal and vertical magnification of the input signal.

When the input video signal is to be displayed as shown in FIG. 2 at (a), the display magnifications for the horizontal and vertical directions are set to be ¾ and 1, respectively. Similarly, when the input video signal is to be displayed as shown in FIG. 2 at (b2), the display magnifications for the horizontal and vertical directions are set to be (¾)×(7/6) and 7/6, respectively. When it is to be displayed as shown in FIG. 2 at (c2), the display magnifications for the horizontal and vertical directions are set to be 1 and 4/3, respectively.

In addition, when the input video signal is to be displayed as shown in FIG. 2 at (d2), the magnifications for the horizontal and vertical directions are set to be (¾)×(5/3) and 5/3, respectively. These magnifications are set by supplying the output signal from the mode setting circuit 104 to the aspect ratio converting circuit as shown in FIG. 1. Other arbitrary magnifications can be similarly set by the output signal from the mode setting circuit 104.

The output signal from the mode setting circuit 104 is supplied not only to the aspect ratio converting circuit 103 but also to the wide cursor adding circuit 105, which specifies the shape of the wide cursor and sets the condition of adding the wide cursor signal.

The wide cursor adding circuit 105 adds (superimposes) the wide cursor signal to or on the output signal from the aspect ratio converting circuit 103, and supplies it to the display 106 having a lateral long screen of aspect ratio (16:9).

When the output signal from the mode setting circuit 104 takes a display mode, for example, that shown in FIG. 2 (a) for convenience of explanation, the wide cursor signal (for specifying the range to be magnified and displayed, by a square frame) is added to the aspect ratio converting circuit 103 as shown in FIG. 2 at (b1), (c1) or (d1).

The wide cursor adding circuit 105 includes, as described above, the cursor signal generating circuit 107 for generating the wide cursor signal in accordance with the output signal from the mode setting circuit 104, and the cursor signal superimposing circuit 108 for superimposing the generated wide cursor signal to the output signal from the aspect ratio converting circuit 103. The video signal with the wide cursor signal superimposed is supplied to the laterally long display 106, which then displays, as shown in FIG. 1, the wide cursor signal according to the display magnification in order to visually inform the user of the range to be displayed over the entire screen in the next step.

Arbitrary display magnifications including at least the three different magnifications shown in FIG. 2 at (b1), (c1) and (d1) can be set in the vertical direction by use of, for example, a field memory and a line memory. The magnifications in the horizontal direction can be set by use of, for example, a line memory and a memory for storing one pixel.

Figure 3:
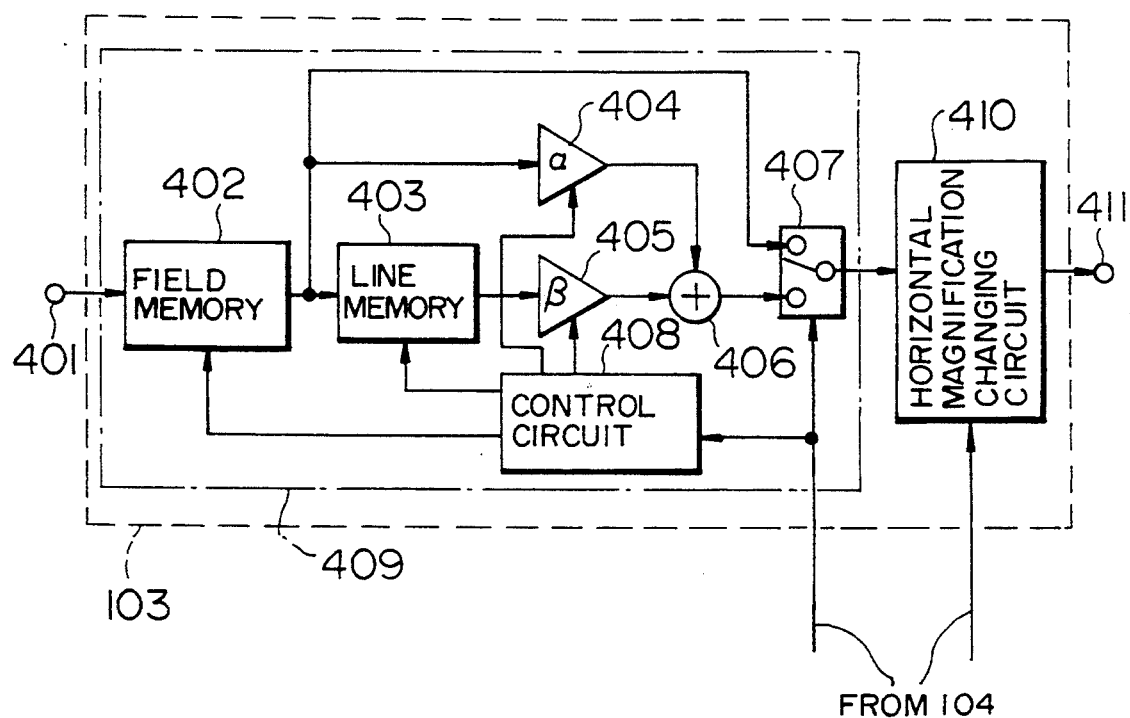
FIG. 3 is a block diagram of one example of the aspect ratio converting circuit shown in FIG. 1.

FIG. 3 shows one specific example of the aspect ratio converting circuit 103 for realizing the display method. In FIG. 3, there are shown an input terminal 401 for the doubled-scan speed-converted signal from the interpolation/scan speed conversion processing circuit 102, a field memory 402, a line memory 403, coefficient multipliers 404, 405, an adder 406, a selector 407 for switching the output signal from the field memory 402 and the output signal from the adder 406, a control circuit 408 for controlling the field memory 402, the line memory 403, and the multipliers 404, 405, a vertical magnification changing circuit 409, a horizontal magnification changing circuit 410 and an output terminal 411 to the display 106.

Figure 5:
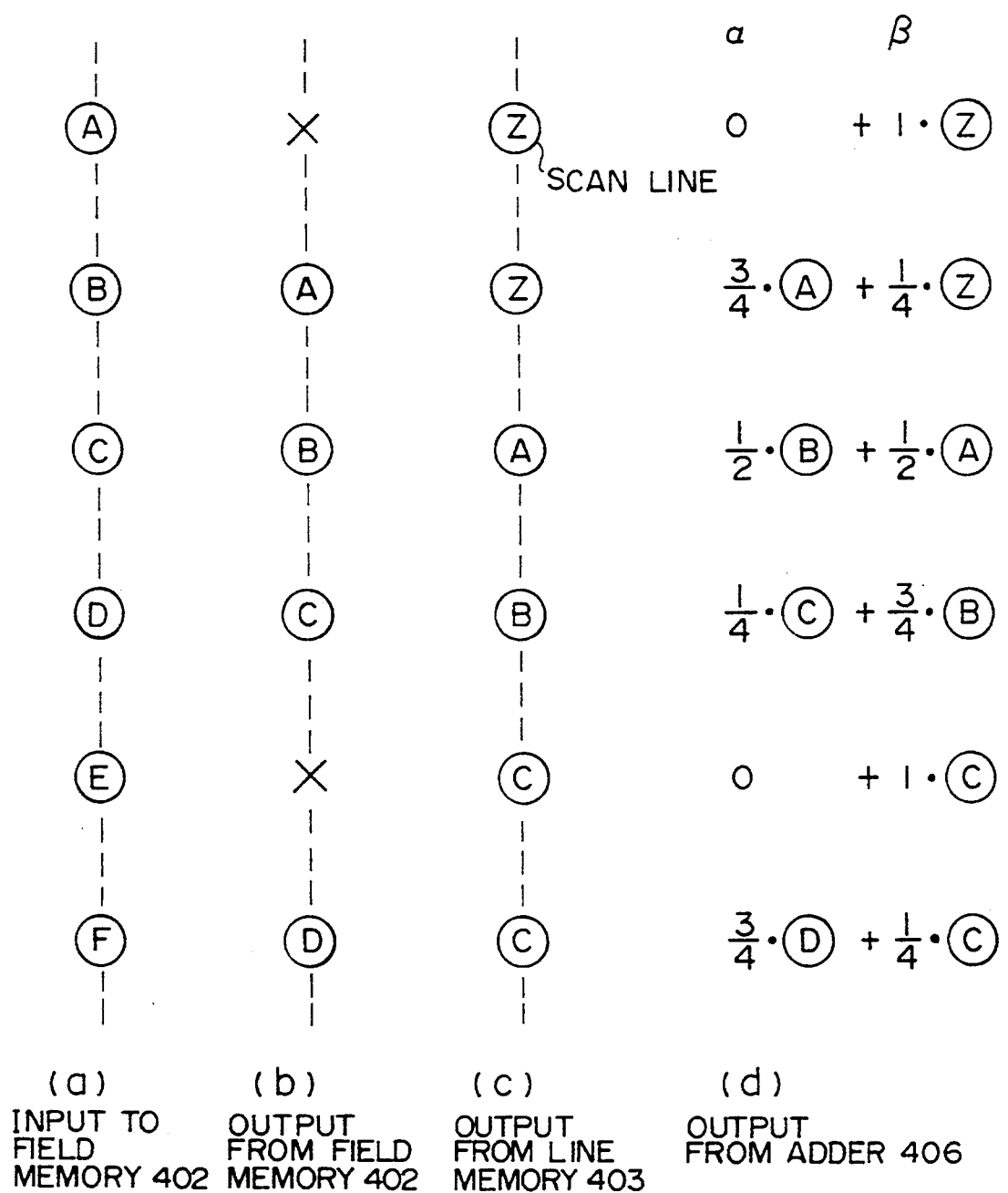
FIG. 5 is a diagram of scan lines to which reference is made in explaining the operation of the aspect ratio converting circuit.

The operation of the vertical magnification changing circuit 409 shown in FIG. 3 will be described with reference to FIG. 5. FIG. 5 shows one example of the arrangement of scan lines on the screen of the display as viewed from the horizontal direction of the screen, or in the scanning direction. This scan line arrangement corresponds to the display mode of magnification 4/3 shown in FIG. 2 at (c2).

FIG. 5 (a) shows the non-interlaced, doubled-scan speed converted video signal which is supplied through the input terminal 401 to the field memory 402. FIG. 5(b) shows the output signal which is read to be delayed from the field memory 402. The scan lines A, B, C shown in FIG. 5(b) are, respectively, delayed one line relative to the same scan lines shown in FIG. 5 (a), and the scan line D is delayed two lines relative to the corresponding scan line shown in FIG. 5(a). FIG. 5(c) shows the output signal from the line memory 403, and FIG. 5(d) shows the values of coefficients ($\alpha$, $\beta$) of the multipliers 404, 406 and the output signal from the adder 406.

Since the normal video field memory cannot be randomly accessed to, this embodiment employs the method for reading 3 lines and then stopping from reading for one line, thereby realizing the magnification of 4/3. As a result, the signal fed to the field memory 402, FIG. 5(a), is read in the form as shown in FIG. 5(b).

The line memory 403 is controlled so that the previous line signal is repeatedly read during the period in which no signal is read from the field memory 402. Thus, under this control, the line memory 403 produces the output signal shown in FIG. 5(c). The scan line Z shown in FIG. 5 is one line before the scan line A. The scan lines A, B and C occur in this order.

If the coefficients $\alpha$, $\beta$ of the multipliers 404, 405 are set as shown in FIG. 5(d) relative to FIG. 5 (b), (c), the adder 406 produces a vertically interpolated magnified video signal. For other magnifications, similarly the field memory 402 is intermittently operated in accordance with the magnification, and the signal read from the field memory 402 and the signal read from the line memory 403 are used to produce an interpolated signal. The "intermittent operation" means that the field memory alternately makes reading operation and cease operation. The number of data (pixels) sequentially read from the field memory 402 during one reading operation period depends on the magnification.

For example, FIG. 2(b2) can be realized by producing seven interpolation scan lines from six scan lines. FIG. 2(d2) can be realized by producing 5 interpolation scan lines from three scan lines. In the case of FIG. 2(d2), however, the field memory 402 is necessary not to make successive cease operations, or necessary to make one reading operation, one cease operation, one reading operation, one cease operation and further one reading operation. This is because the following line memory 403 has a capacity of one scan line.

No magnification can be made by changing the selector 407 to the position for FIG. 5(a). No magnification can also be achieved by selecting the $\alpha$, $\beta$ of the multipliers 404, 405 to be 1, 0 respectively and treating the signal read from the field memory 402 directly as the output signal from the adder 406. In this case, the selector 407 can be eliminated, and thus the circuit arrangement can be simplified.

Figure 6:
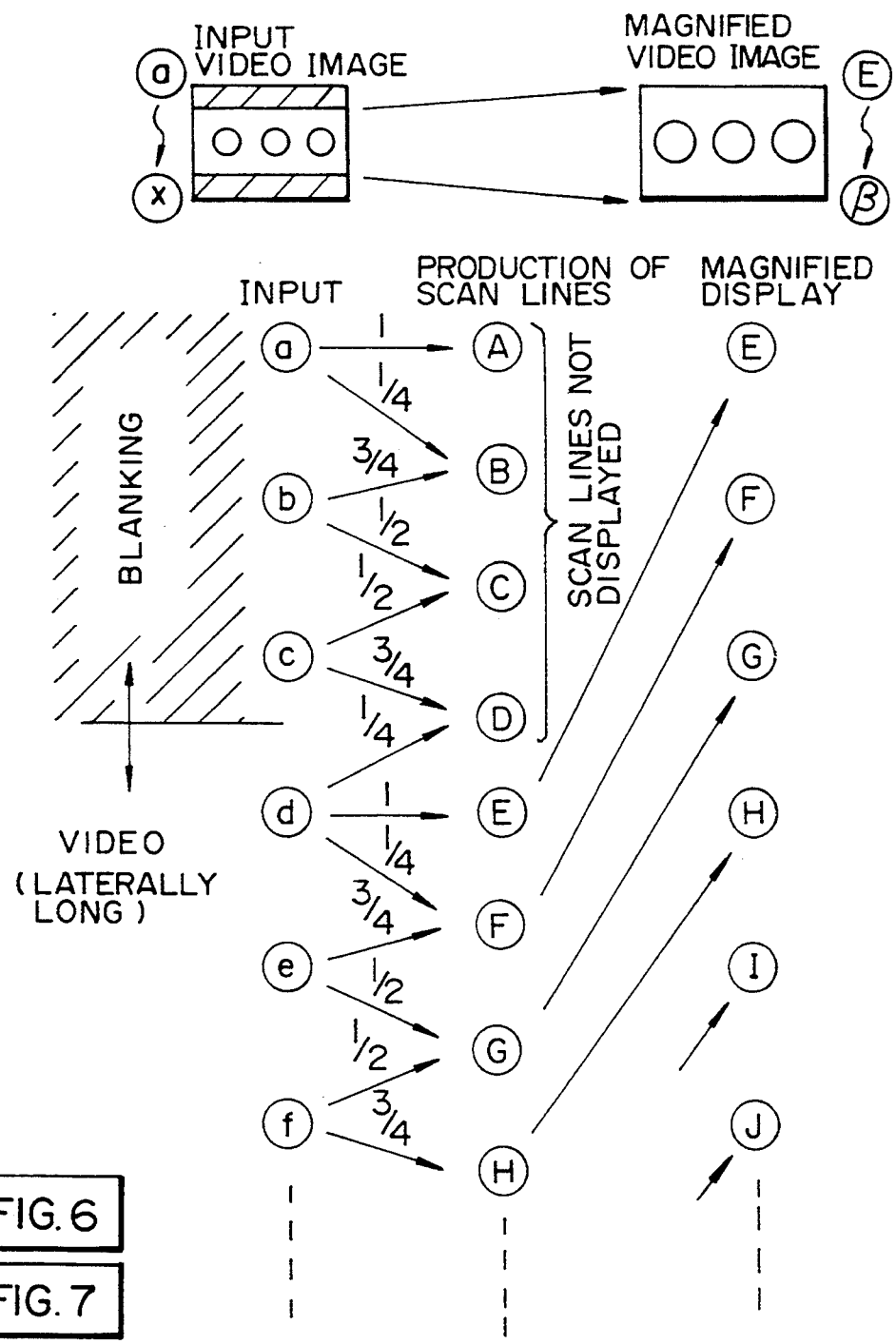
FIG. 6 is a part of a diagram specifically showing the situation in which a video signal of a non-wide aspect ratio is processed and displayed as a video signal of a wide aspect ratio on the screen.
Figure 7:
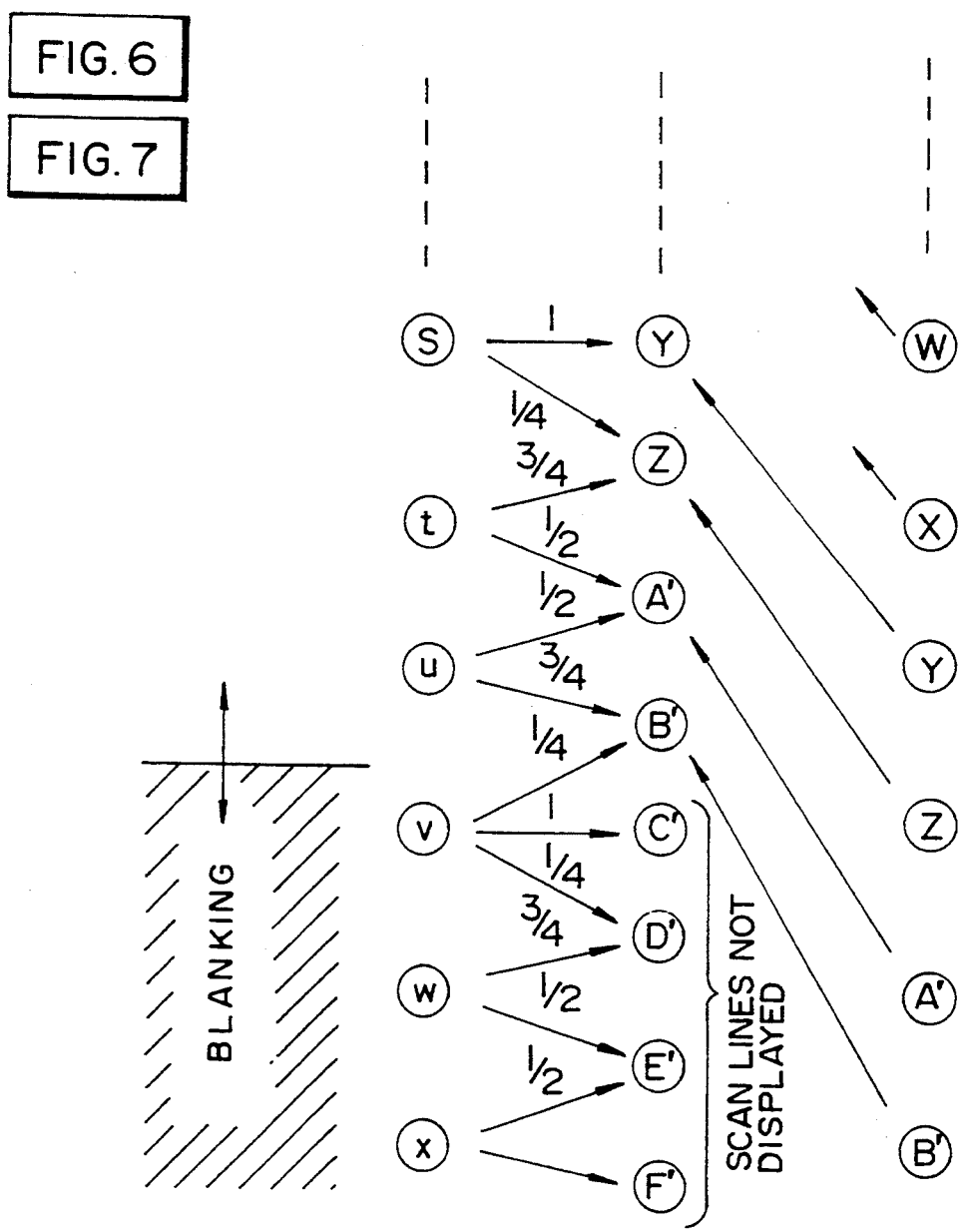
FIG. 7 is the other part of the diagram specifically showing the situation in which a video signal of a non-wide aspect ratio is processed and displayed as a video signal of a wide aspect ratio on the screen.

FIGS. 6 and 7 are combined to be a single drawing, which is an explanatory diagram specifically showing the situation in which the input video signal of a non-wide aspect ratio is processed as shown in FIG. 5 and magnified and displayed on the screen as a wide-aspect ratio video signal. In a pair of FIGS. 6 and 7, FIG. 6 shows the upper part of the drawing, and FIG. 7 is the lower part thereof.

In FIGS. 6 and 7, the number of scan lines of the video signal of a non-wide aspect ratio is assumed to be 24 (a, b, c, ..., v, w, x) per frame. The scan lines a, b, c and v, w, x indicate the scan lines within the upper and lower blanking areas of each magnified frame.

New interpolation scan lines (A, B, C, ..., D', E', F') are produced by the way shown in FIGS. 3 and 5 so that the number of scan lines is 32 or 4/3 times. Of these scan lines, 24 necessary video scan lines (E, F, G, ..., Z, A', B') are displayed as a wide aspect ratio video image.

In this way, the video signal can be displayed at the vertical magnification in the mode shown in FIG. 2(c2). The display at other magnifications shown in FIG. 2(b2) and (d2) can also be easily realized by the construction shown in FIG. 3. In other words, the control circuit 408 causes the field memory 402 to intermittently operate in accordance with the magnification, and the signals read from the field memory 402 and line memory 403 are multiplied by the coefficients at the multipliers 404, 405 and added at the adder 406, thus producing the interpolation signal.

The horizontal magnification changing circuit 410 shown in FIG. 3 will be mentioned.

Figure 4:
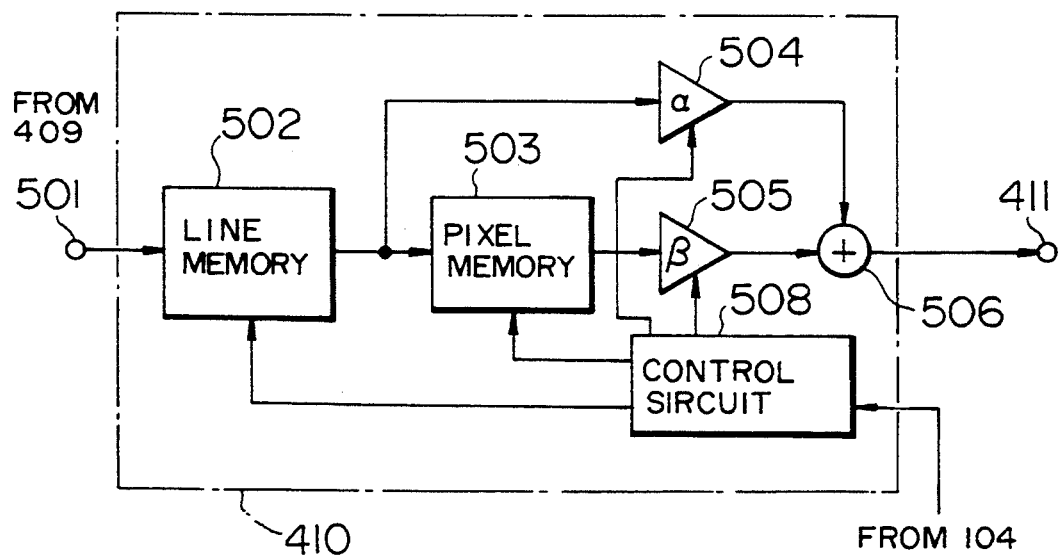
FIG. 4 is a block diagram of one example of the horizontal magnification changing circuit shown in FIG. 3.

FIG. 4 is a block diagram of one example of the construction of the horizontal magnification changing circuit 410. Referring to FIG. 4, there are shown an input terminal 501 which is connected to the vertical magnification changing circuit 409, a line memory 502, a one-pixel memory 503, multipliers 504, 505, an adder 506, and a control circuit 508 for controlling the line memory 502, the pixel memory 503 and the multipliers 504, 505.

The horizontal magnification changing circuit shown in FIG. 4 operates substantially in the same way as in FIG. 3 except that the magnification is not vertical but horizontal. In other words, while in FIG. 3 the video signal is stored in the vertical direction in the field memory 402, in FIG. 4 the video signal is stored in the horizontal direction in the line memory 502 and intermittently read under the control signal from the control circuit 508. In addition, the video signal is delayed one pixel by the pixel memory 503, and the pixel-interpolated signal is produced by the multipliers 504, 505 and the adder 506. Consequently, the horizontal magnification changing circuit 410 produces a magnified video signal of a selected horizontal magnification at its output terminal, 411.

The clock frequency which fundamentally controls the operation of the horizontal magnification changing circuit 410, when a video signal of a non-wide aspect ratio is treated, is 4/3 times the clock frequency at which the interpolation/scan speed conversion processing circuit 102 is driven to produce an output signal. The reason for this is that as shown in FIG. 2(a), the non-wide aspect ratio video signal is compressed to 3/4 in the horizontal direction for being displayed as a wide-aspect ratio video signal.

Thus, in any mode of FIG. 2(b2), (c2), (d2), the clock frequency is 4/3 times the clock frequency for driving the interpolation/scan speed conversion processing circuit 102 to produce an output signal. This clock frequency is not necessarily strictly 4/3 times as large, but may be substantially an integer multiples of the horizontal scan frequency as long as the objects of the invention can be achieved.

In the above embodiment the output video signal from the interpolation scan speed conversion processing circuit 102 has its horizontal scan frequency, 31.5 kHz which is twice the horizontal scan frequency, 15.75 kHz of the NTSC signal, and this doubled scan-speed video signal is supplied to the aspect ratio converting circuit 103. On the other hand, alternatively, only the interpolation processing can be made without doubling the scan frequency, or the interlaced video signal obtained by only the interpolation processing can be converted into a signal of a different aspect ratio. In other words, the interpolated actual scan line signal and the interpolation scan line signal, or two signals from different circuits are supplied to the aspect ratio converting circuit 103. In this case, the aspect ratio converting circuit 103 is constructed of two different circuits, or the circuit for processing the actual scan lines and the circuit for processing the interpolation scan lines. Since this circuit arrangement uses a low frequency, the power consumption in the circuits is small.

It can be considered that in FIG. 3 the circuits (403–408, 410) following the field memory 402 or in FIG. 4 the circuits (503–506, 508) following the line memory 502 are driven at the clock frequency, 4/3 times as large. The latter circuits consume lower power, and thus they are desirable.

Also, it will be obvious from FIGS. 3 and 4 that other modes than the three modes shown in FIG. 2 can be realized by changing the vertical and horizontal magnifications. When the horizontal and vertical magnifications are 1, a laterally compressed NTSC signal of a longitudinally long image can be most suitably displayed over the entire wide screen of aspect ratio (16:9).

According to the embodiment of the invention shown in FIG. 1, the horizontal magnification and vertical magnification can be arbitrarily set by the mode setting circuit 104. Thus, when a signal of a non-wide aspect ratio is displayed as a wide-aspect ratio image on the wide screen, the magnifications can be arbitrarily set. Also, a new function can be realized by which a part to be displayed as a wide aspect ratio image, of the non-wide aspect ratio signal can be marked in the non-wide aspect signal by the cursor.

Another embodiment of the invention concerning the cursor display will be described below.

Figure 8:
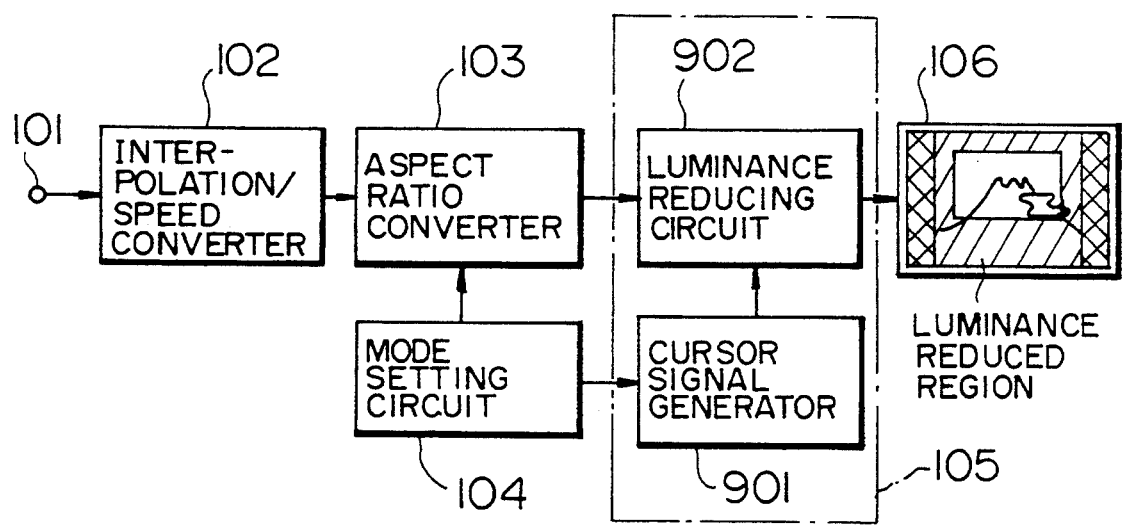
FIG. 8 is a block diagram of another embodiment of the invention.

FIG. 8 is a block diagram of another embodiment of the invention. Referring to this figure, there are shown a cursor signal generating circuit 901, a luminance reducing circuit 902 and other circuits which are the same as those in FIG. 1.

The cursor signal generating circuit 901 generates a cursor signal by which the region not to be displayed as a wide aspect ratio image can be specified as indicated by the shaded area on the wide-screen display 106. This cursor signal is supplied to the luminance reducing circuit 902. This luminance reducing circuit 902 reduces the level of the luminance signal of the region which is not displayed, of the video signal produced from the aspect ratio converting circuit 103, and supplies it to the wide-screen display 106. As a result, the image displayed on the wide-screen display 106 looks as if it were rising to the surface of the screen and thus it is very easy to see. The user can be clearly informed of the location of the cursor.

Figure 9:
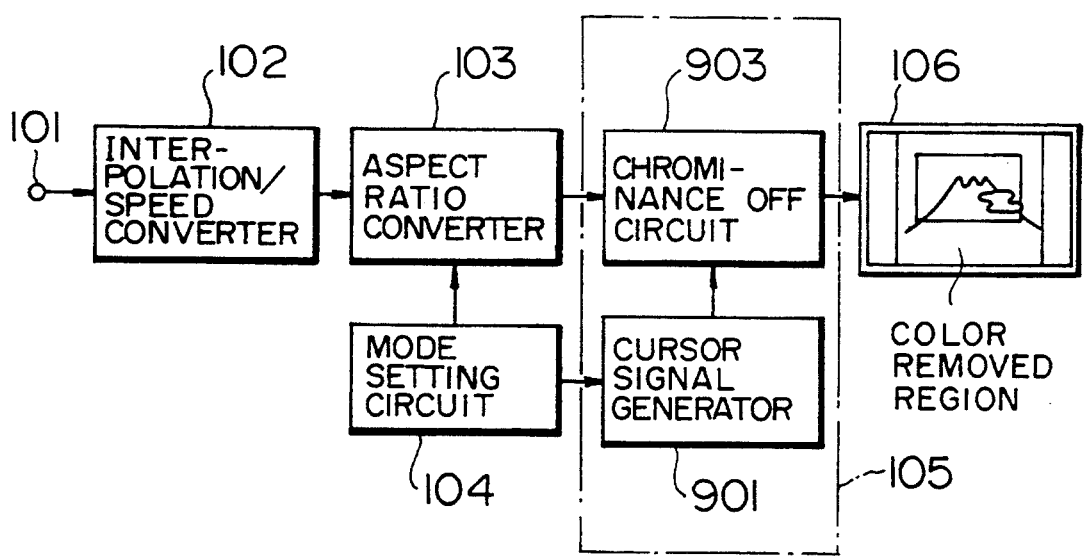
FIG. 9 is a block diagram of still another embodiment of he invention.

FIG. 9 is a block diagram of still another embodiment of the invention. In this figure, there are shown a chrominance signal off circuit 903 and other circuits which are the same as those in FIGS. 1 and 8.

In this embodiment, the chrominance signal off circuit 903 is responsive to the signal from the cursor signal generating circuit 901 to convert the level of the chrominance signal of the region which is not displayed, of the video signal from the aspect ratio converting circuit 103, into a non-color level and supply it to the wide-screen display 106. As a result, only the region to be converted into a wide image is colored in the image displayed on the wide-screen display 106, and thus the user can be clearly informed of the location of the cursor.

The cursor display methods shown in FIGS. 8 and 9 can be used together with the method of displaying only the cursor frame shown in FIG. 1. In this case, the user can be more clearly informed of the location of the cursor. For reproducing the reference levels of the luminance signal and chrominance signal on the display, the cursor signal generating circuits 107 and 901 are constructed to be inhibited from producing the output signal during the blanking period of the video signal.

This embodiment can provide a wide-screen television receiver which is able to arbitrarily set the display magnifications at which the non-wide aspect ratio signal can be displayed on the wide-screen display.

Moreover, this embodiment can provide a wide-screen television receiver having a new function by which the user can be previously visually informed of where the image to be displayed at a wide aspect ratio is located within the frame of the input video signal.

Figure 10:
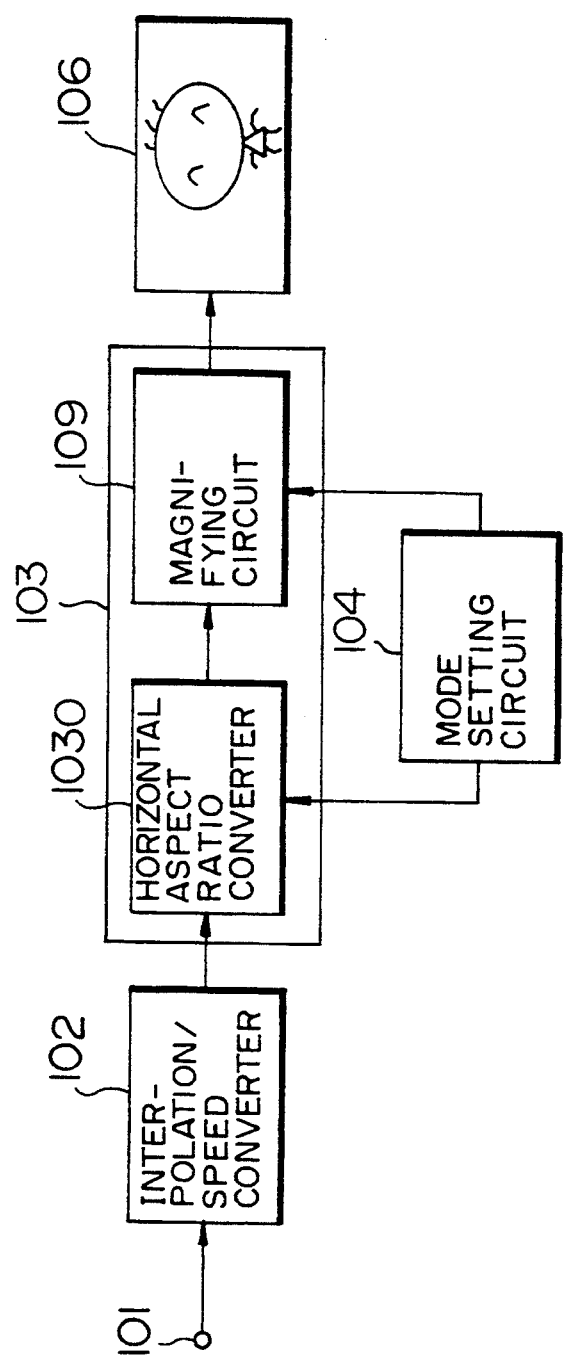
FIG. 10 is a block diagram of further embodiment of the invention.

FIG. 10 is a block diagram of still another embodiment of the wide-screen television receiver of the invention. In FIG. 10, like elements corresponding to those in FIGS. 1, 3, 4, 8 and 9 are identified by the same reference numerals and will not be described.

Referring to FIG. 10, there are shown a magnification processing circuit 109 for magnifying a given part of the image of a video signal at arbitrary magnification power, and the mode setting circuit 104 for specifying a conversion mode of a horizontal aspect ratio converting circuit 1030 and for specifying the magnifying power and location to be set by the magnification processing circuit 109. The horizontal aspect ratio converting circuit 1030 converts the time-axis of the video signal. The horizontal aspect ratio converting circuit 1030 and the magnification processing circuit 109 constitutes an aspect ratio converting circuit 103.

A description will be made of the operation of this embodiment of the invention for the case in which an NTSC signal of a non-wide aspect ratio 4:3 is supplied as an input signal.

In this embodiment, a digitized video signal at the input terminal 101 is supplied to the interpolation/scan speed conversion processing circuit 102, which then successively executes a series of processes such as Y/C separation, scan line interpolation and so on and produces a video signal of a luminance signal and color difference signals. The interpolation/scan speed conversion processing circuit 102 may have a movement-adaptive circuit which serves to reduce the picture quality deterioration upon magnification irrespective of the presence or absence of a movement, since the input video signal at the input terminal 101 is of the interlaced scan system.

Then, the video signal from the interpolation/scan speed conversion processing circuit 102 is supplied to the horizontal aspect ratio converting circuit 1030, where it is compressed in the horizontal direction by use of a memory in order to be adaptive to the wide-screen display 106. To this end, the memory within the horizontal aspect ratio converting circuit 1030 is read at the read clock frequency corresponding to about 4/3 times as high as the write clock frequency. In this embodiment, the input video signal after interpolation processing is converted in its scan frequency from the horizontal scan frequency of 15.75 kHz of NTSC signal into a doubled scan-speed frequency of 31.5 kHz and then supplied to the horizontal aspect ratio converting circuit 103. However, as in the first embodiment, it is possible not to perform the doubled scan-speed processing but to perform only the interpolation processing so that the two signals of the actual scan line signal and the interpolated scan line signal can be supplied to the horizontal aspect ratio converting circuit 1030. In this case, the construction of the horizontal aspect ratio converting circuit 1030 and the advantageous merits obtained by this construction are the same as in the first embodiment.

The horizontally compressed video signal from the horizontal aspect ratio converting circuit 1030 is supplied to the magnification processing circuit 109, where an arbitrary portion specified by the mode setting circuit 104 can be magnified at given magnification powers in the horizontal and vertical directions.

Figure 11:
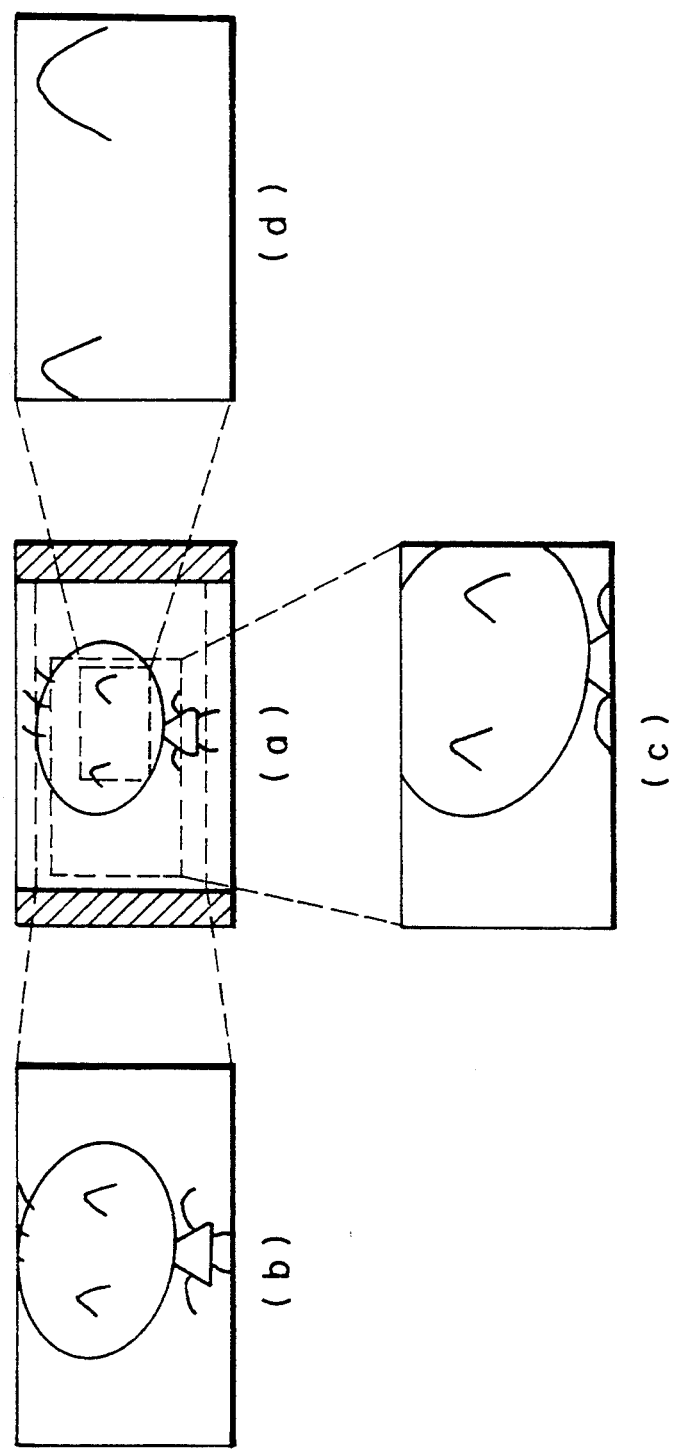
FIG. 11 is a diagram showing the situation in which an arbitrary part of the image is magnified and displayed on the wide screen according to this invention.

This situation is shown in FIG. 11. FIG. 11 (*a*) indicates the image of the horizontally compressed video signal, and FIG. 11 (*b*), (*c*) and (*d*) show the images of the portions that are specified and magnified at designated magnification powers by the mode setting circuit 105.

The range of the image to be magnified can be changed by changing the locations of the video signal to be written in and read from the field memory for the vertical magnification or to be written in and read from the line memory for the horizontal magnification. The concrete means for changing the locations of the video signal to be written in and read from the memory is known as disclosed in JP 64-46377 and so on. In other words, this can be realized by shifting the write address and the read address. Therefore, here only a concrete circuit and control method for magnification will be described below.

Figure 25A:
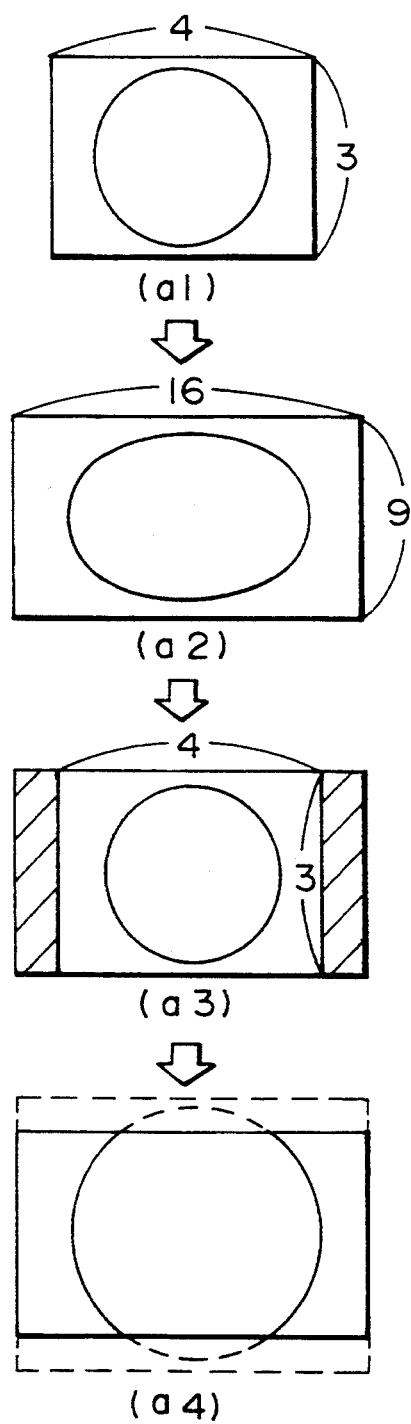
FIGS. 25A and 25B show examples of displaying an image on the wide screen in the prior art.
Figure 25B:
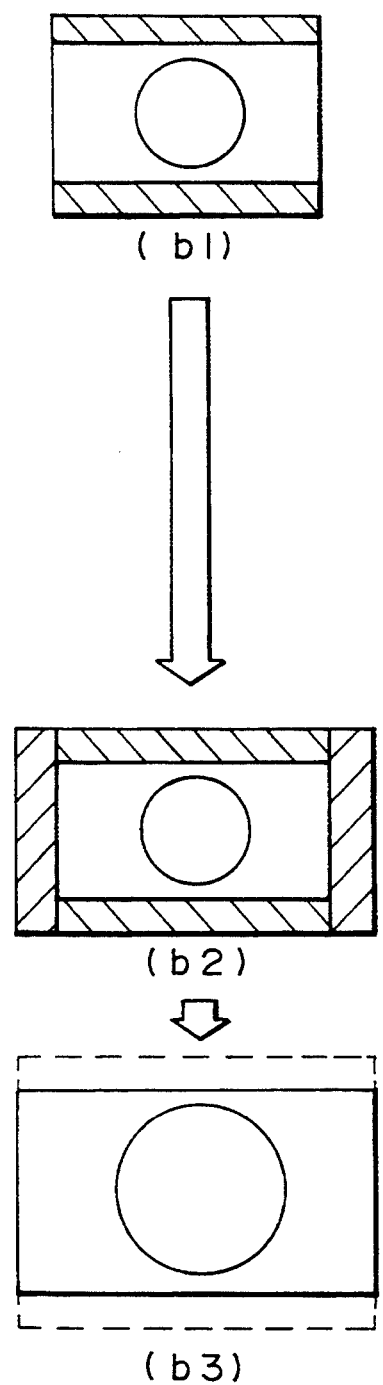

In order to realize the magnified and displayed modes of FIG. 25A (a4) and (b3), this embodiment makes 4/3-times magnification to a horizontally compressed signal in the horizontal and vertical directions by use of the magnification processing circuit 109. The vertical magnification can be made by use of, for example, a field memory and a line memory, and the horizontal magnification can be made by use of, for example, a line memory and a pixel memory for storing one pixel.

Figure 12:
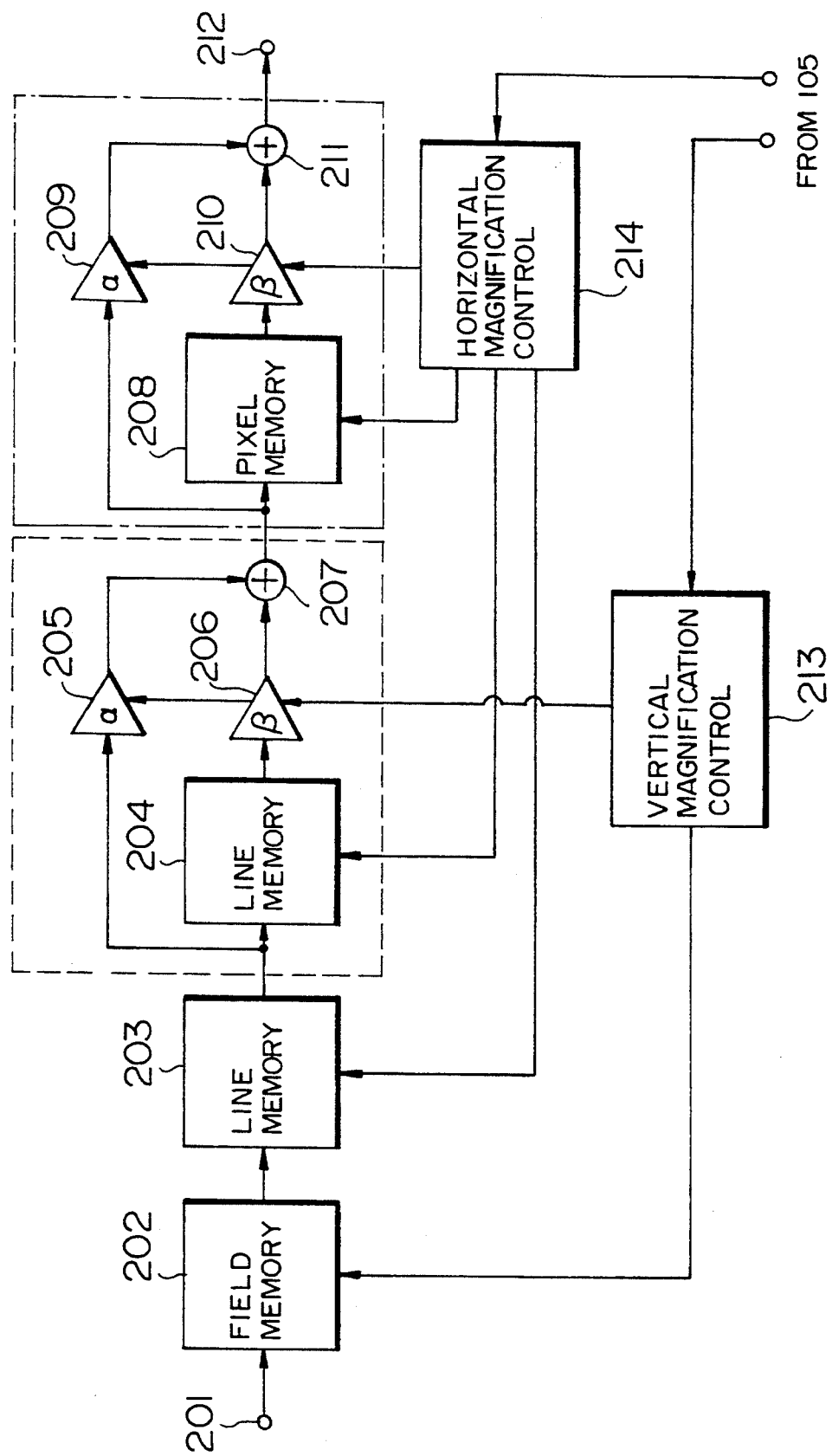
FIG. 12 is a block diagram of a specific example of the aspect ratio converting circuit and magnification processing circuit.

FIG. 12 is a block diagram of a specific example of the horizontal aspect ratio converting circuit 1030 and magnification processing circuit 109 in FIG. 10. These circuits magnify an arbitrary portion of the image at given magnification powers including 4/3 times.

Referring to FIG. 12, there are shown a video input terminal 201 for the video signal from the interpolation processing circuit 102, a field memory 202, line memories 203, 204, vertical multipliers 205, 206, an adder 207, a pixel memory 208, horizontal multipliers 209, 210, an adder 211 and an output terminal 212 to the wide-screen display 106. In addition, there are shown a vertical magnification control circuit 213 which is ordered to control the field memory and the vertical multipliers by the mode setting circuit 105, and a horizontal magnification circuit 214 which is ordered to control the line memories, the pixel memory and the horizontal multipliers by the mode setting circuit 105.

The operation of the circuit arrangement shown in FIG. 12 will be described with reference to FIG. 13.

Figure 13:
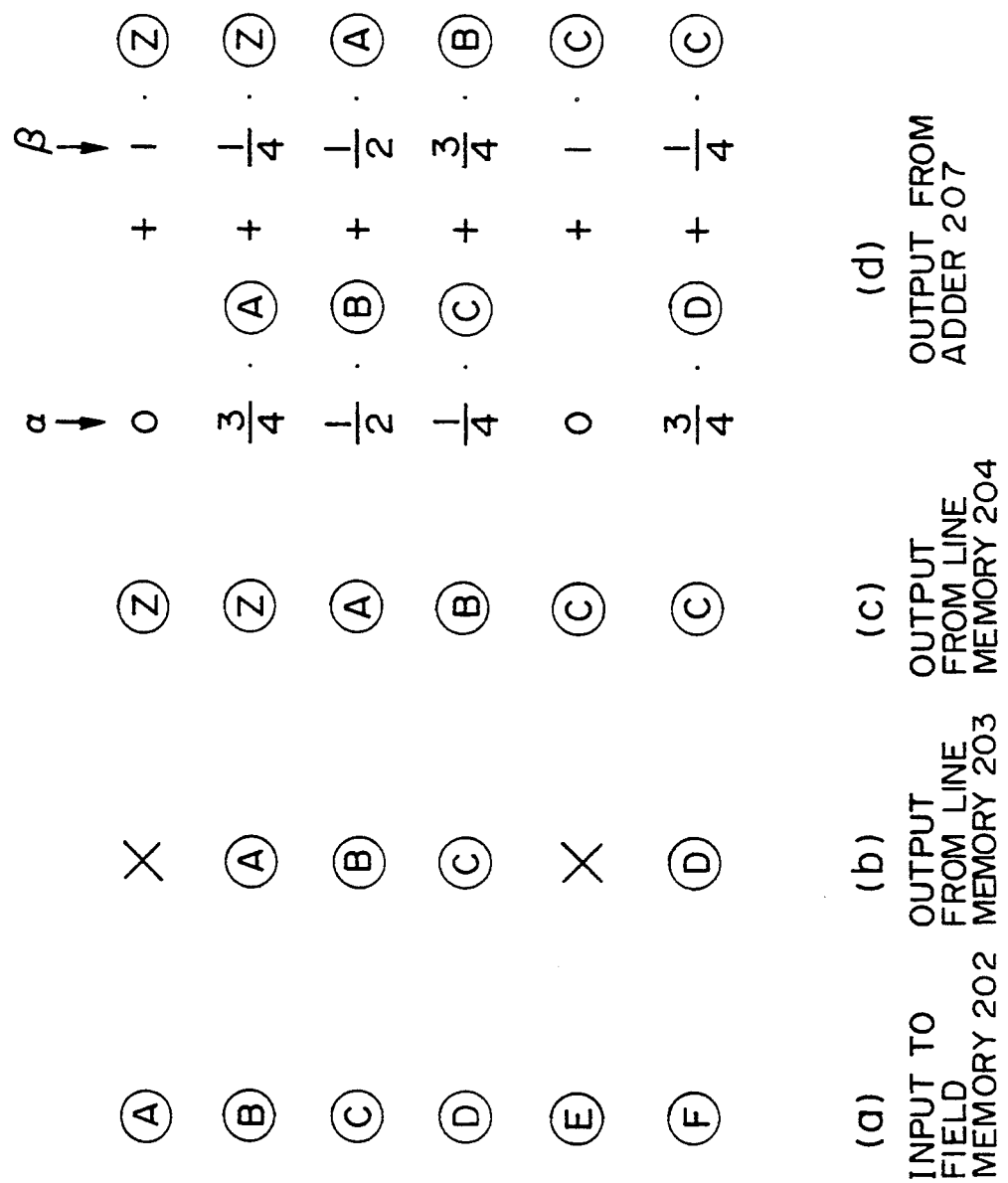
FIG. 13 is a diagram showing scan lines in the case of magnification of 4/3.

FIG. 13 shows an example of the scan line arrangement for the display mode in which the image is magnified 4/3 times in the vertical direction. In FIG. 13, A-F and Z are scan lines, (*a*) is the video signal which is supplied from the input terminal 201 to the field memory 202, (*b*) is the output signal read from the line memory 203, (*c*) is the output signal read from the line memory 204, and (*d*) is the output signal from the adder 207.

The video signal stored in the field memory 202, when magnified 4/3 times as in this example, is read for three lines, and then stopped from reading for one line. In addition, the read signal is converted in its aspect ratio into the output signal (*b*) by the line memory 203. The video signal (*b*) from the line memory 203 and the video signal (*c*) which is produced from the line memory 204 where the video signal (*b*) is delayed one line are, respectively multiplied by coefficients $\alpha$ and $\beta$ which are determined by the specified magnification powers as shown at (*d*). These products are added so that new four scan lines can be produced from the original three scan lines.

On the other hand, the horizontal magnification can be understood from FIG. 13 by replacing the scan lines shown in FIG. 13 by pixels. In other words, A-F and Z are pixels, (*a*) is the input to the line memory 203, (*b*) is the output from the adder 207, (*c*) is the output from the pixel memory 208, and (*d*) is the output from the adder 211.

The video signal stored in the line memory, when magnified 4/3 times, is read for three pixels and then stopped from reading for one pixel. The video sigal from the adder 207 and the one-pixel delayed video signal from the pixel memory 208 are, respectively, multiplied by coefficients which are determined by the specified magnification powers. These products are added so that new four pixels can be produced from the original three pixels.

Figure 14:
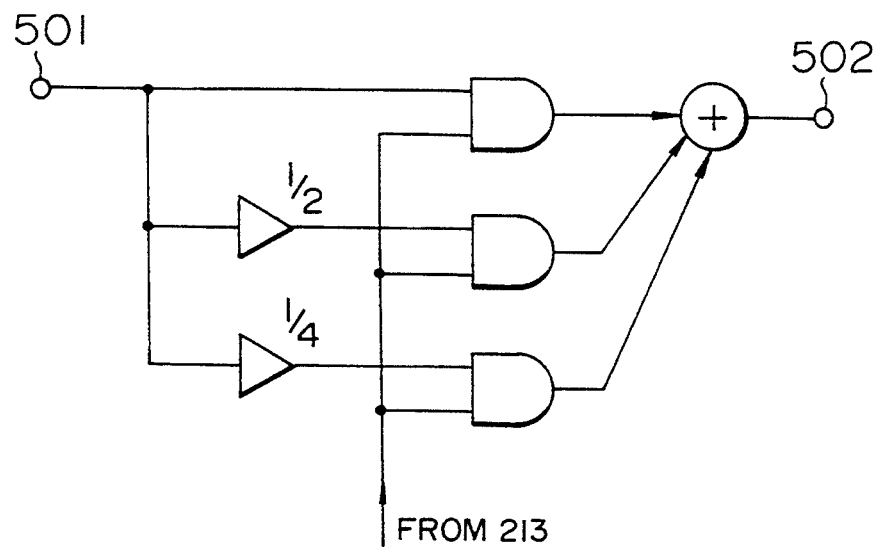
FIG. 14 is a circuit diagram of a specific example of the multiplier shown in FIG. 12.

FIG. 14 shows a detailed circuit arrangement of the multiplier. Referring to FIG. 14, there is shown an input terminal 501 for the video signal. For the vertical magnification, the output signal from the line memory 203 or 204 is supplied to the input terminal, and for the horizontal magnification the output signal from the adder 207 or pixel memory 208 is supplied to the input terminal. When the magnification power is 4/3 times, coefficients $\frac{1}{4}$, $\frac{1}{2}$ and $\frac{3}{4}$ are necessary as shown in FIG.

13. In order to obtain these coefficients, the video signal supplied to the input terminal 501, ½ this input video signal and ¼ this input video signal are added in accordance with the control signal from the vertical magnification control circuit 213. Thus, a signal multiplied by a certain coefficient can be produced at the output terminal 502.

Figure 15:
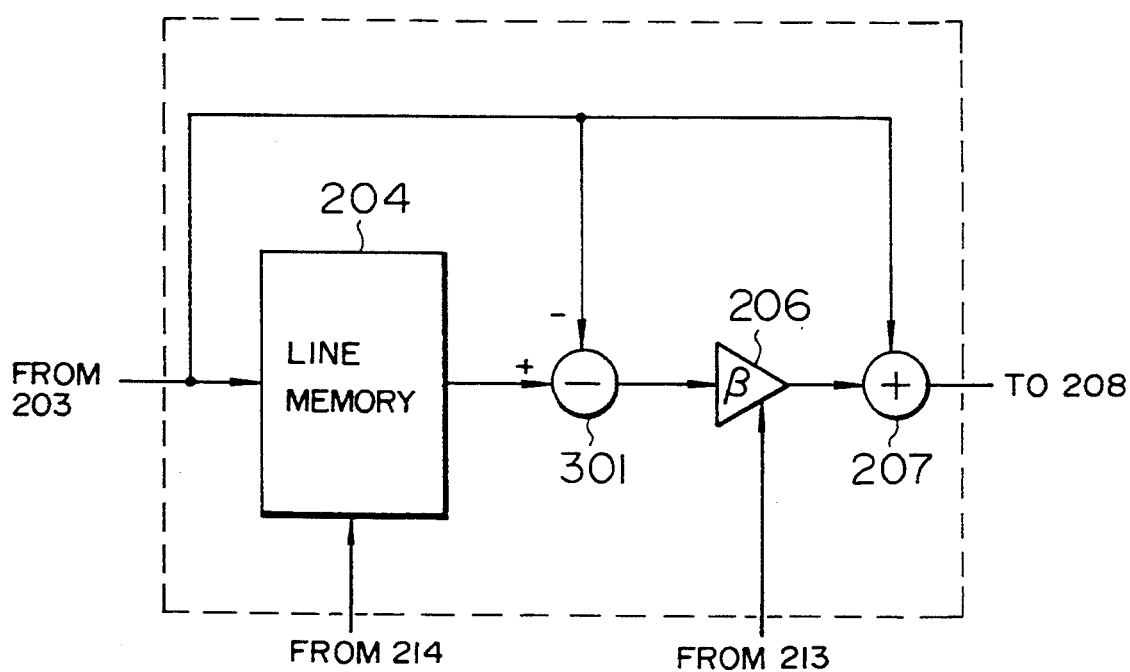
FIG. 15 is a block diagram of another specific example of the circuitry surrounded by a broken line in FIG. 12.

The circuit surrounded by a broken line in FIG. 12 can be replaced by the circuit arrangement of the same function shown in FIG. 15, which can be derived from a modification of the equation (1). In FIG. 15, there are shown a subtraction circuit 301, and other circuit blocks of which the same reference ones as those in FIG. 12 act in like manner. The circuit arrangement shown in FIG. 15 has a smaller circuit scale than that shown in FIG. 12, and thus it is easy to realize.

$$Y = \alpha \cdot A + \beta \cdot B \quad (1)$$
$$= (1 - \beta) \cdot A + \beta \cdot B$$
$$= (B - A) \cdot \beta + A$$

Figure 16:
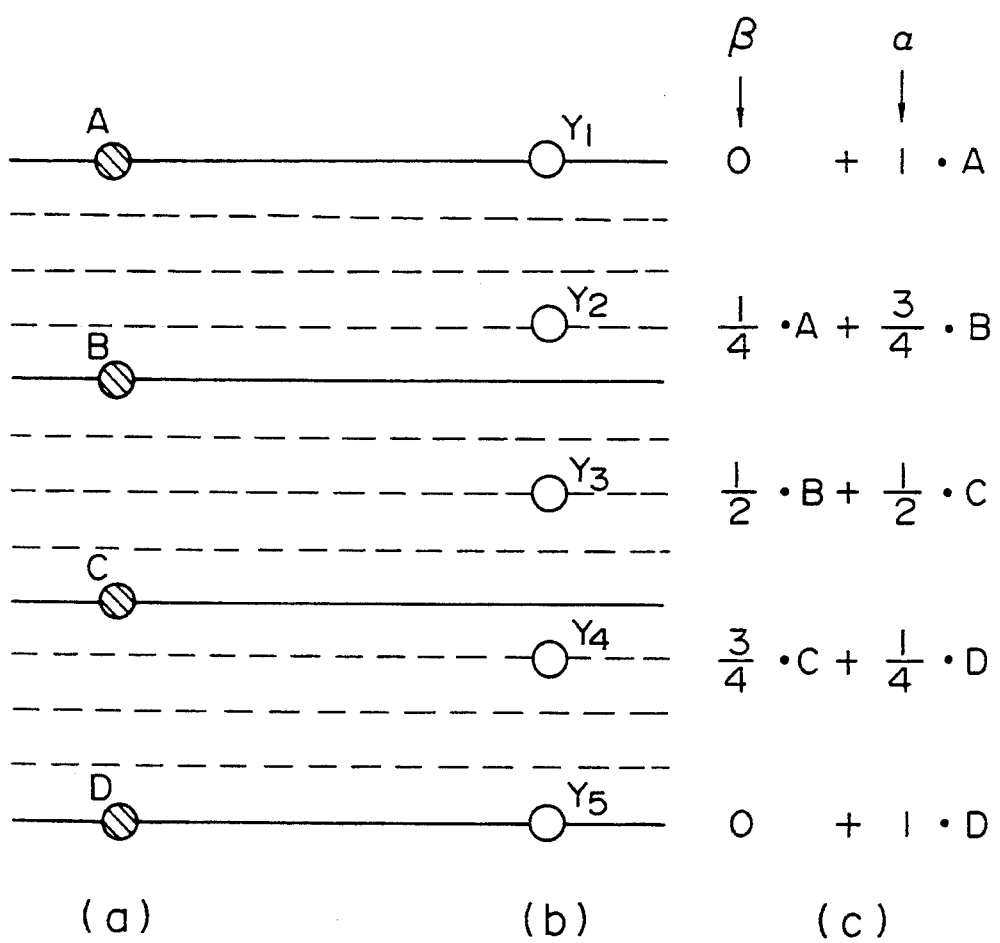
FIG. 16 is a diagram showing interpolation scan lines in the case of magnification of 4/3.

FIG. 16 shows the positional relation between the scan lines before the magnification processing for 4/3 times in the vertical direction, and interpolation scan lines. In FIG. 16, (a) is the scan lines before magnification, (b) is the interpolation scan lines, and (c) is the equations for interpolation scan lines.

The adjacent upper and lower scan lines of the scan lines (a) before magnification are used to produce interpolation scan lines (b). These interpolation scan lines are arranged at the locations of the original scan lines, thereby achieving the magnification.

The coefficients used for the magnification of 4/3 times are expressed by $N/2^n$ ($0 \leq N \leq 2^n$) such as ¼, ¾, ½. $2^n$ is the divisor between the scan lines, or the number of interpolation scan lines which can be produced by use of two lines before magnification and which are interposed at different locations between the two lines. For 4/3 times of this example, $2^n = 4$, and hence four interpolation scan lines can be produced by use of two lines before magnification and interposed between the two lines at different locations.

In order to specify the magnification power more finely, it is necessary to increase the divisor between the scan lines, or $2^n$.

An example of a large divisor, or $2^n = 256$ will be mentioned below.

Figure 17:
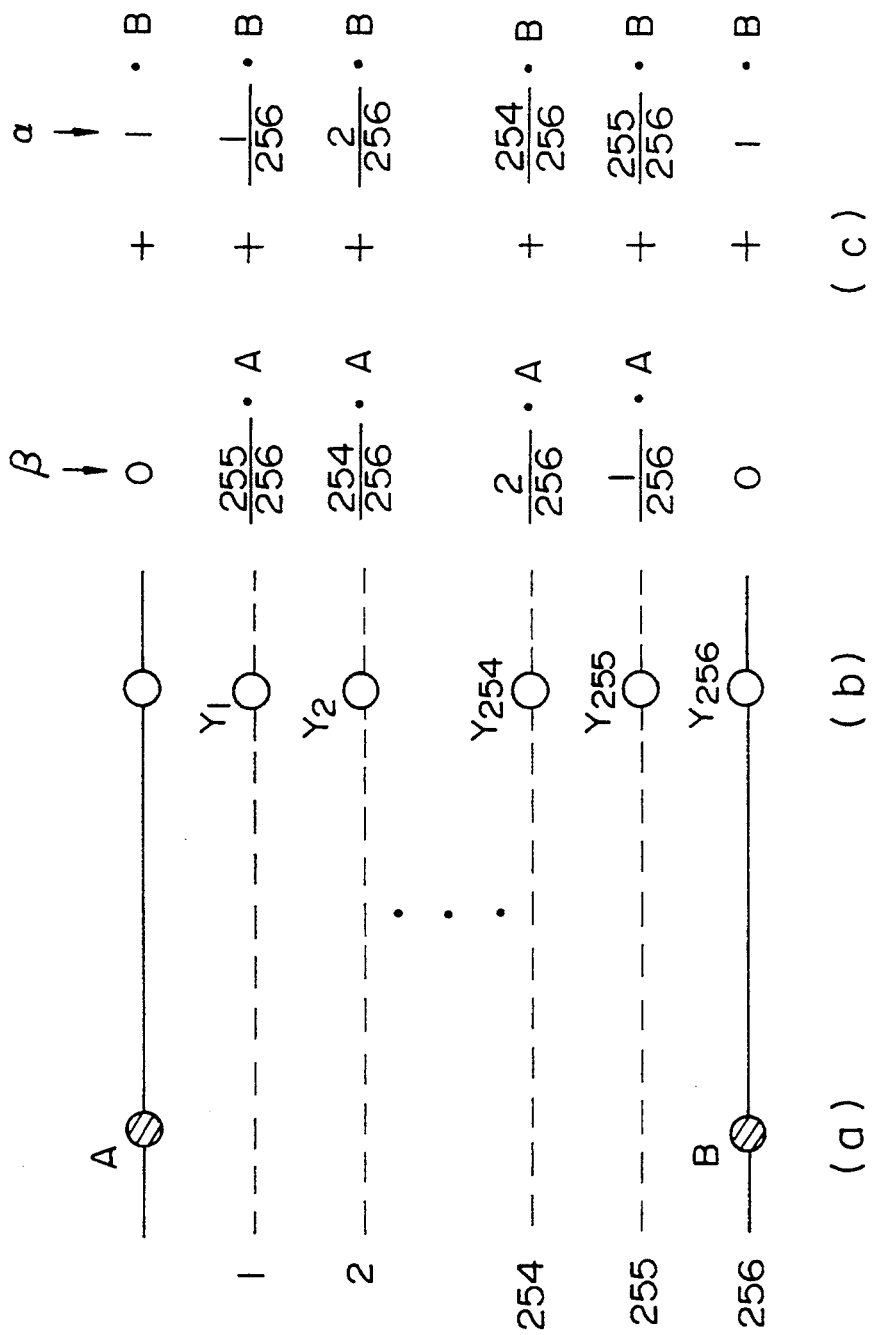
FIG. 17 is a diagram showing interpolation scan lines in the case of $2^n=256$.

When the divisor $2^n$ between the scan lines is taken as 256 as illustrated in FIG. 17, 256 different interpolation scan lines, Y1–Y256 can be produced at different locations between two lines by arithmetic processing of the two lines before magnification.

However, the coefficients for magnification sometimes cannot be expressed by N/256 for a certain magnification power. For example, the coefficients cannot be expressed by a smaller number, $2^n$ than 256 or by $N/2^n$. When the magnification power is specified further more finely, $2^n$ is further increased. However, the circuit scale is also increased to increase the cost.

Figure 18:
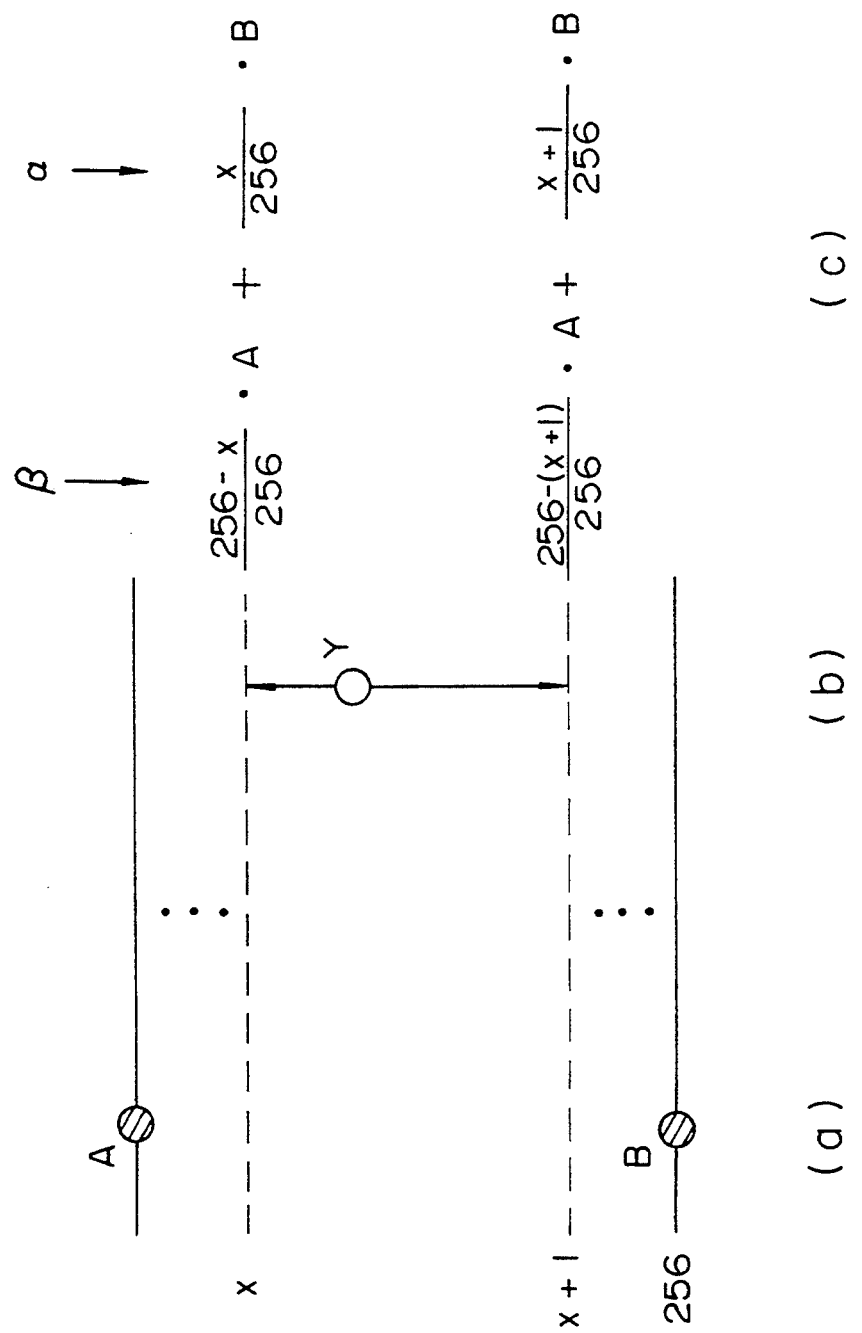
FIG. 18 is a diagram showing interpolation scan lines located where no image is formed under a coefficient of $N/256$.

An example of arbitrarily specifying the magnification power by a limited circuit will be described with reference to FIG. 18.

If an interpolation scan line is necessary to be placed at the location Y (where the interpolation scan line cannot be produced by the arithmetic computation using the coefficient expressed by N/256), the distances are measured between this interpolation scan line and the interpolation scan lines between which the former scan line is interposed and which can be produced by the coefficient of N/256, and one closer to the scan line at Y is selected. In FIG. 18, for example, the upper interpolation scan line is selected. to be placed at the location Y (where the interpolation scan line cannot be produced by the arithmetic computation using the coefficient expressed by N/256), the distances are measured between this interpolatiot by use of a limited circuit which is determined by the value of the divisor $2^n$.

Figure 19:
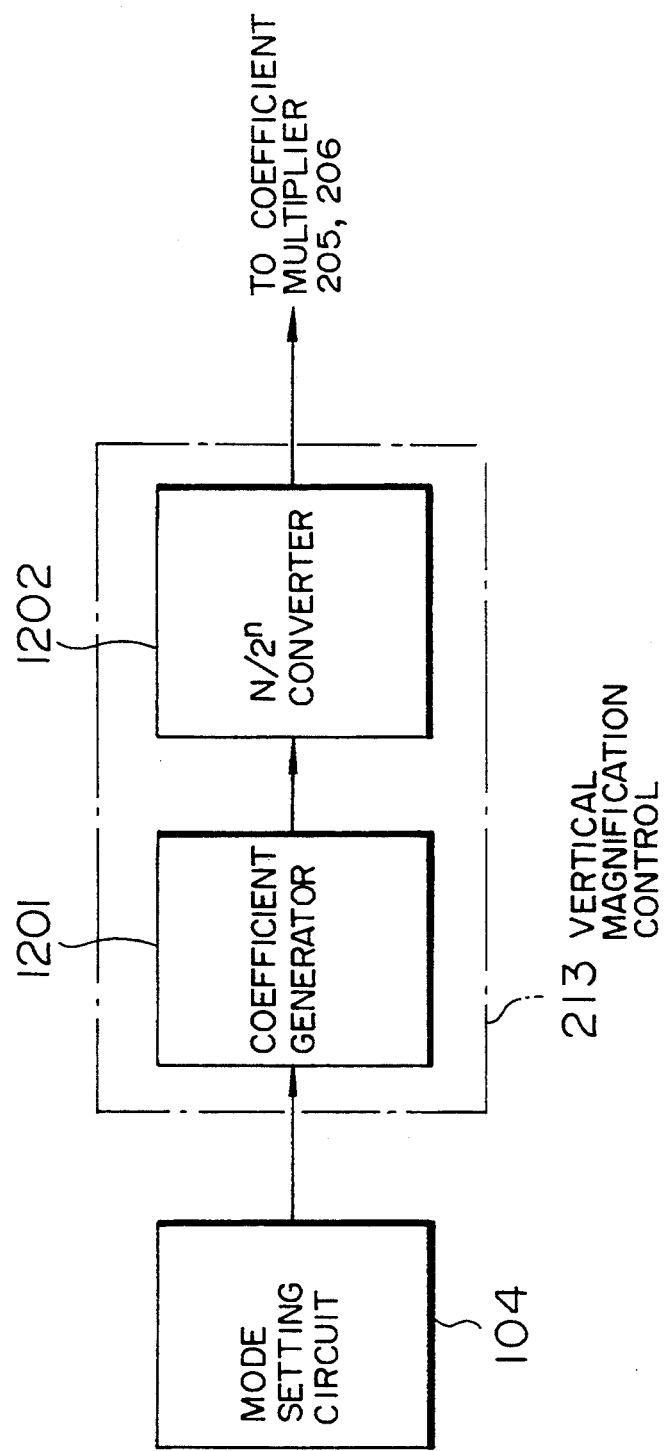
FIG. 19 is a block diagram of a specific example of the coefficient approximation circuit of the vertical magnification control circuit shown in FIG. 12.

FIG. 19 is a block diagram of a concrete example of the vertical magnification control circuit 213 for the coefficient approximation in FIG. 12. Referring to this figure, there are shown a coefficient generating circuit 1201 for generating the coefficient corresponding to the magnification power set by the mode setting circuit 105, and a coefficient converting circuit for converting the original coefficient generated by the coefficient generating circuit 1201 into the coefficient of $N/2^n$. The vertical magnification control circuit 213 including these two circuits further includes a control portion for the horizontal aspect ratio converting circuit 1030, though not shown.

Referring to FIG. 19, when an arbitrary magnification power is specified by the mode setting circuit 105, the vertical magnification control circuit 213, for realizing the specified magnification power, makes interpolation so that necessary interpolation scan lines, when cannot be expressed by the coefficient of $N/2^n$, are determined by approximating the coefficient by using such $N/2^n$ that is closest to the original interpolation location. The $N/2^n$ coefficient converting circuit 1202 can be formed of, for example, a circuit for taking several bits from the MSB of a digital coefficient.

The n of $N/2^n$ will be considered. Since the number of the vertical scan lines of an NTSC signal is 262/field, $n = 8$ ($2^n = 256$) will basically suffice for realizing up to 256 times magnification. The magnification power of 256 means that the image of two scan lines is magnified to the size of the full screen. The actual magnification power is not required to be such a large value, but will be supposed to be at most 2 to 3 times. It was experimentally confirmed that such a range of magnification power, or $n = 3$ ($2^n = 8$) hardly incurred poor picture quality because the image has strong vertical and horizontal correlations.

Figure 20:
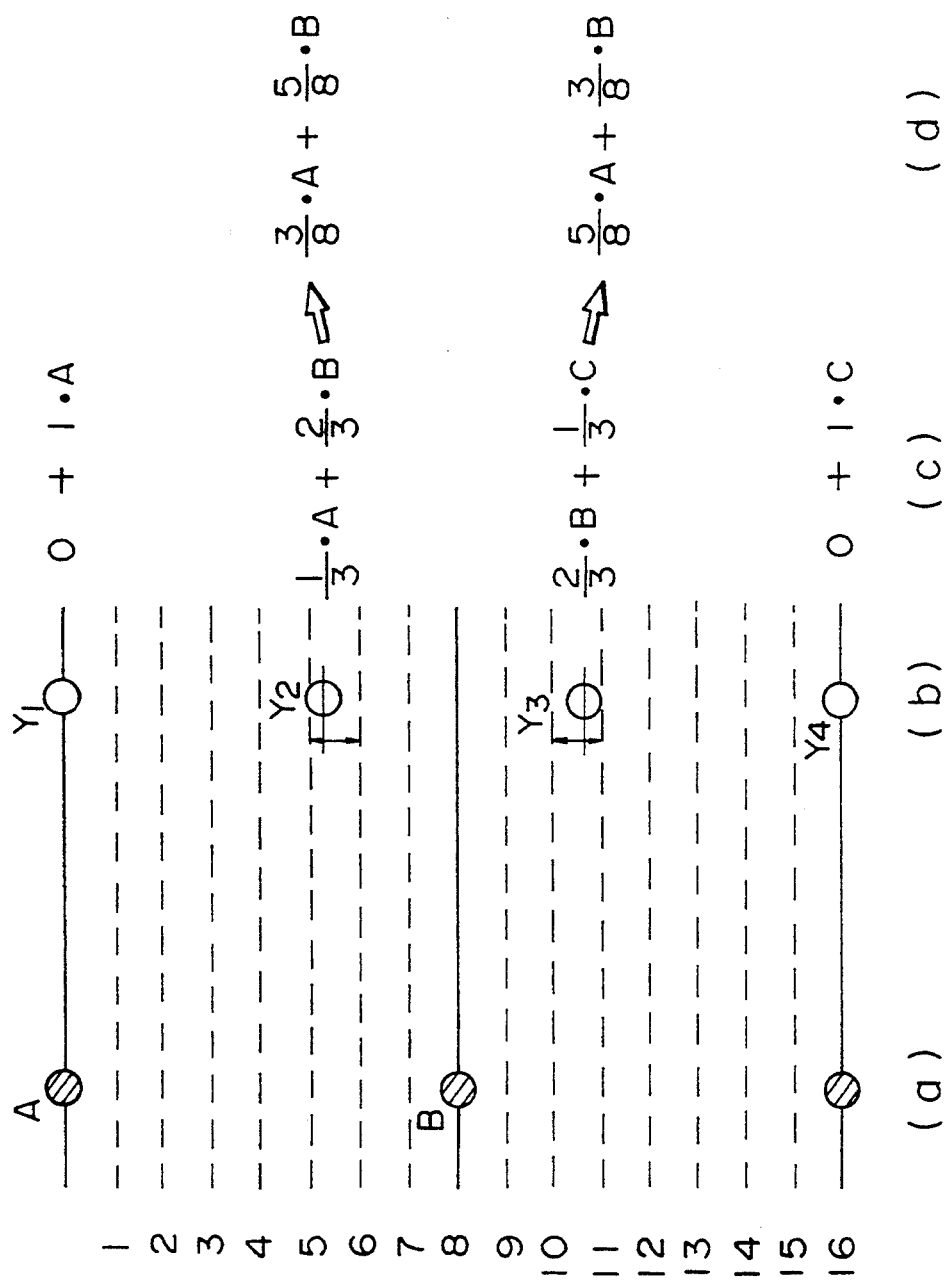
FIG. 20 is a diagram showing interpolation scan lines in the case of the approximation of the coefficient to N/8 for magnification of 3/2.

FIG. 20 shows an example of the approximation of the coefficient for 3/2 times magnification to N/8 ($n = 3$) which coefficient can not be expressed by $N/2^n$. In FIG. 20, (a) is the original scan lines before magnification as in FIG. 16, and (b) is the original locations of interpolation scan lines. If the coefficient is expressed by N/8, interpolation scan lines A, B before magnification, and interpolation scan lines can be produced at locations 9–16 by the scan lines B, C. In FIG. 20, since Y2 is located between the locations 5 and 6 of the interpolation scan lines which can be produced by scan lines A, B before magnification, the distances between Y2 and locations 5, 6 are determined, and the cmaller distance, or location 5 is selected. For Y3, similarly the location 11 is selected.

Figure 21:
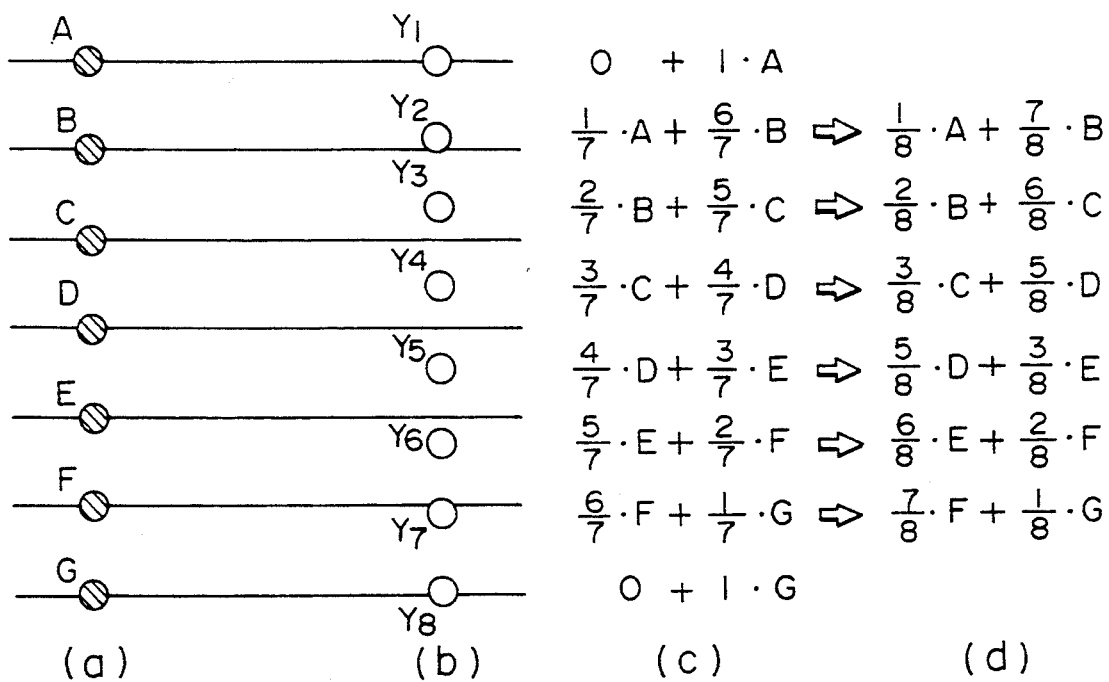
FIG. 21 is a diagram showing interpolation scan lines in the case of the approximation of the coefficient to N/8 for magnification of 7/6.

FIG. 21 shows the same approximation for 7/6 times magnification.

Figure 22:
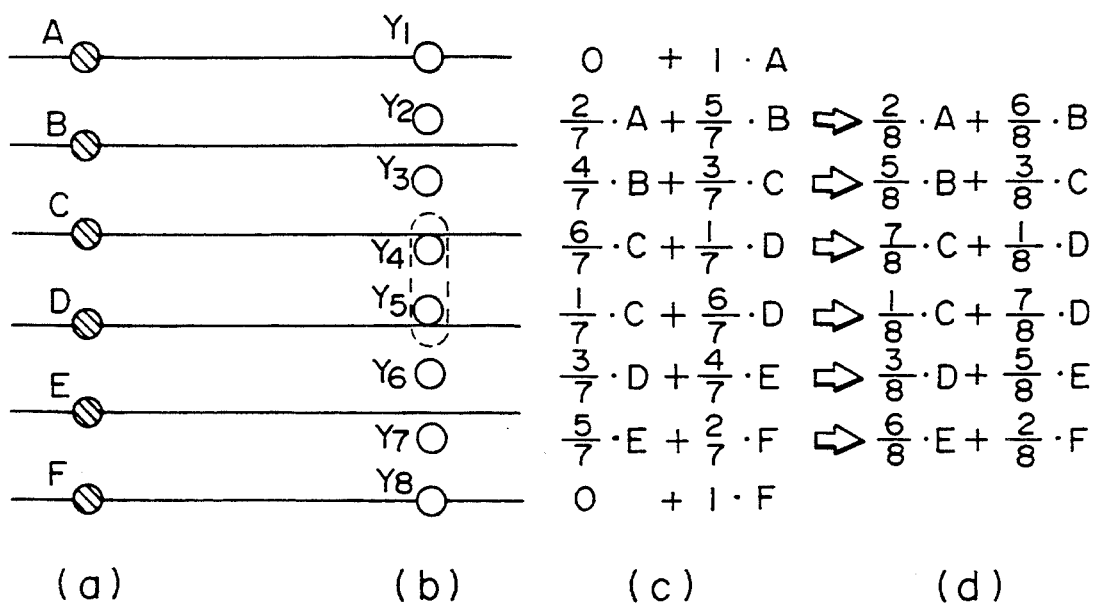
FIG. 22 is a diagram showing interpolation scan lines in the case of the approximation of the coefficient to N/8 for magnification of 7/5.

With reference to FIG. 22, a description will be made of other magnification power than (N+1)/N times, or the case in which two or more interpolation scan lines are located between the original scan lines, or 7/5 times.

As illustrated, two interpolation scan lines are produced at locations Y4 and Y5 by the scan lines C, D before magnification.

FIG. 23 shows one example of the arrangement of scan lines for 7/5 times magnification. In FIG. 23, (a) is the input to the field memory 202 (FIG. 12), and (b) is the output from the line memory 203. Also, (c) and (d) are the output from the line memory 204, in which case (c) is when the line memory 203 is stopped from reading the video signal and when the line memory 204 is, at the same time, stopped from reading, and (d) is obtained when the output from the line memory 203 is simply delayed one line by the line memory 204.

For the magnification power (N+1)/N such as 4/3, it is satisfactory that the input signal be delayed one line by the line memory 204 as at (d). However, when two interpolation scan lines are inserted between the original scan lines as for 7/5 times, this magnification cannot be realized only by simply delaying one line through the line memory 204. Therefore, the horizontal magnification control circuit 214 controls the line memories 203 and 204 to stop from writing and at the same time to start reading.

When three or more interpolation scan lines are produced between the original two scan lines before magnification, the number of the above repetitive reading operations is increased for realizing the magnification. For the horizontal magnification, similarly the pixel memory has the function of holding the stored pixel.

For the horizontal magnification, pixels are used in place of the scan lines for the vertical magnification mentioned above.

Figure 24:
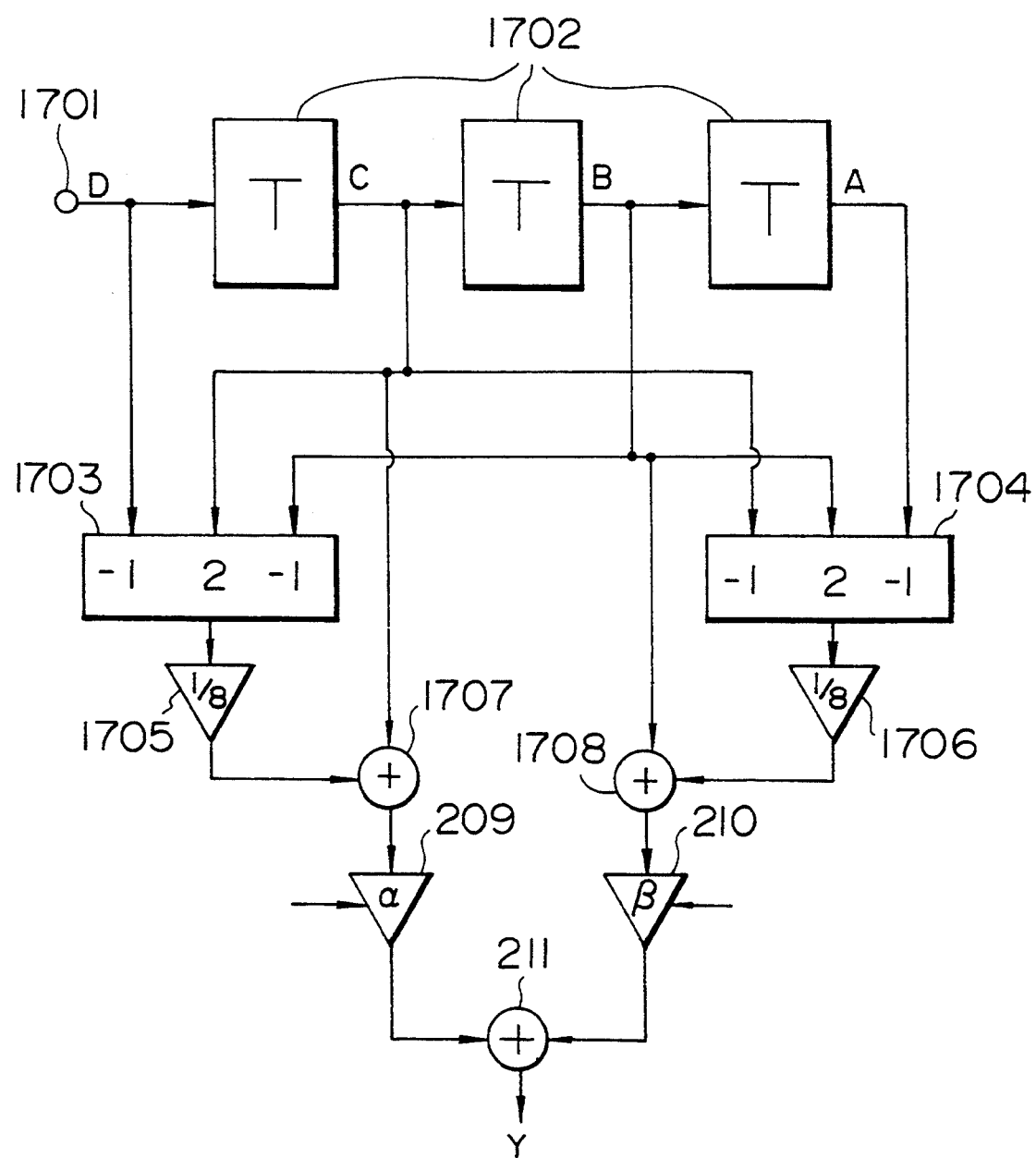
FIG. 24 is a block diagram of another specific example of the circuitry surrounded by a broken line in FIG. 12.

The circuit surrounded by a one-dot chain line in FIG. 12 may be the circuit arrangement shown in FIG. 24. In FIG. 24, there are shown a video input terminal 1701 for the video signal from the adder 207, delay circuits 1702 for delaying the video signal by one pixel, and pixels A to D. The pixels C to A are delayed one to three pixels relative to the pixel D of the video signal fed to the input terminal 1701. Also, there are shown high-pass filters (HPF) 1703, 1704, multipliers 1705, 1706, the horizontal multipliers 209, 210, and the adder 211. Y is the output from the adder 211, or the output of the scan lines of the horizontally and vertically interpolated and thus magnified image, as expressed by the equation (2).

$$Y = \alpha \left[ \frac{1}{8}(-D + 2C - B) + C \right] + \beta \left[ \frac{1}{8}(-C + 2B - A) + B \right]$$

$$= \frac{\alpha}{8}(-D + 10C - B) + \frac{\beta}{8}(-C + 10B - A) \quad (2)$$

The arrangement shown in FIG. 24 has the merit that the high frequency components can be prevented from being reduced by the horizontal addition of pixels. In other words, the high frequencies of the pixel C are corrected for by the HPF 1703, multiplier 1706 and adder 1707, and the high frequencies of the pixel B are corrected for by the HPF 1704, multiplier 1706 and adder 1708. The high-frequencies corrected pixels C and B are multiplied by coefficients, $N/2^n$ and $1-N/2^n$ in the multipliers 209 and 210, respectively, and then the products are added by the adder 211. In this case, the interpolation pixels can be produced with their high frequency components almost not deteriorated, thus improving the performance.

For the vertical magnification in FIG. 24, similarly the pixels A to D for the horizontal magnification are replaced by scan lines, and the delay circuit 1702 for the horizontal magnification is considered to delay the input video signal by one line in place of one pixel.

This embodiment is able to take various different constructions for synthesizing the coefficients of $N/2^n$, $1-N/2^n$ as in FIGS. 12, 15 and 24 and various modifications thereof are also possible. This invention however includes all the circuit arrangements that synthesize these coefficients through approximation.

The video signal thus magnified is produced from the magnification processing circuit 104 and supplied to the wide-screen display 106. Thus, part or all of the image of the input video signal is displayed on the wide screen without horizontal and vertical distortions.

As described with reference to the drawings, all values of magnification power can be realized by this magnification with approximate coefficient and by a limited circuit which is determined by $2^n$ (n is preferably 3 to 8), and thus a specified arbitrary portion of the image can be displayed over the entire wide screen as a high quality magnified image.

According to this embodiment, since the coefficient is approximated to $N/2^n$, a limited circuit scale which is determined by the value of $2^n$ suffices for realizing the magnification power at which interpolation scan lines that cannot be produced by $N/2^n$ are necessary, and all values of magnification power including other magnification powers than (N+I)/N can be realized. Thus, an arbitrary part of the image of the input video signal can be displayed at a given magnification power on the wide screen as a high quality magnified image.

We claim:

1. A wide-screen television receiver capable of reducing or magnifying a part of a non-wide image to be displayed, so that said part of the image can be displayed on an entire wide screen, comprising:

an interpolation circuit for making interpolation of scan lines for an interlaced scan system video signal supplied thereto so as to convert said interlaced scan system video signal into a non-interlaced scan system video signal;

an aspect ratio converting circuit having a plurality of display magnification modes, and which, when supplied with an input video signal which is said non-interlaced scan system video signal from said interpolation circuit, converts the time-axis of said input video signal in accordance with the aspect ratio of said wide screen and then magnifies the time-axis converted video signal in accordance with a part to be displayed on an image of said input video signal to thereby convert the aspect ratio of the part to be displayed in accordance with one of said plurality of display magnification modes;

a mode setting circuit for selecting and setting one of said plurality of display magnification modes; and a display having a screen on a wide aspect ratio, wherein an output video signal from said aspect ratio converting circuit is displayed on the entire area of said screen.

2. A wide-screen television receiver according to claim 1, wherein said aspect ratio converting circuit has a vertical magnification changing circuit for changing a vertical display magnification for said part of the image to be displayed and a horizontal magnification changing circuit for changing a horizontal display magnification.

3. A wide-screen television receiver according to claim 2, wherein said mode setting circuit has a display magnification setting circuit for selecting and setting one of a plurality of display magnifications for each of said vertical magnification changing circuit and said horizontal magnification changing circuit.

4. A wide-screen television receiver according to claim 1, wherein said aspect ratio converting circuit includes:
 a vertical magnification circuit for respectively multiplying two vertically adjacent pixels of the image of said input video signal by approximate coefficients of $N/2^n$ and $1-N/2^n$ (n is a positive integer, and $0 \leq N \leq 2N$) and adding the products to produce interpolation pixels in order to reduce or magnify the image of said video signal in the vertical direction of said wide screen; and
 a horizontal magnification circuit for multiplying two horizontally adjacent pixels of the image of said video signal supplied thereto from said vertical magnification circuit by approximate coefficients of $N/2^n$ and $1-N/2^n$ and adding the products to produce interpolation pixels to reduce or magnify the image of said video signal in the horizontal direction of said wide screen.

5. A wide-screen television receiver according to claim 1, wherein the input video signal and the converted video signal are signals of the same television signal system.

6. A wide-screen television receiver comprising:
 an aspect ratio converting circuit having a plurality of conversion modes, and which, when supplied with an input video signal, converts its aspect ratio in accordance with one of said plurality of conversion modes and produces a converted video signal at its output;
 a mode setting circuit for selecting one of said plurality of conversion modes and setting said selected aspect ratio in said aspect ratio conversion circuit;
 a wide cursor adding circuit which is responsive to said output video signal from said aspect ratio converting circuit to produce a cursor signal for selecting part of an image to be displayed, in accordance with the mode which said mode setting circuit has set in said aspect ratio converting circuit and to superimpose said cursor signal on said video signal produced from said aspect ratio converting circuit; and
 a display of a wide aspect ratio which is supplied with said output video signal from said wide cursor adding circuit and displays a normal image of a non-wide aspect ratio and a cursor for selecting said part of said image which said part is magnified and displayed later.

7. A wide-screen television receiver according to claim 6, wherein the input video signal and the converted video signal are signals of the same television signal system.

8. A wide-screen television receiver according to claim 6, further comprising an interpolation circuit which is provided before said aspect ratio converting circuit, said interpolation circuit making interpolation of scan lines for an interlaced scan system video signal supplied thereto so as to convert it into a non-interlaced system video signal and supplying said converted video signal to said aspect ratio converting circuit.

9. A wide-screen television receiver according to claim 8, wherein said cursor signal is generated only in a predetermined conversion mode of said plurality of conversion modes.

10. A wide-screen television receiver according to claim 6, wherein said wide cursor adding circuit includes a cursor signal generating circuit for generating a cursor signal by which a part of the image to be displayed is selected, in accordance with the mode which said mode setting circuit has set in said aspect ratio converting circuit, and a cursor signal superimposing circuit for superimposing said cursor signal from said cursor signal generating circuit on the output video signal from said aspect ratio converting circuit.

11. A wide-screen television receiver according to claim 10, further comprising an interpolation circuit which is provided before said aspect ratio converting circuit, said interpolation circuit making interpolation of scan lines for an interlaced scan system video signal supplied thereto so as to convert it into a non-interlaced system video signal and supplying said converted video signal to said aspect ratio converting circuit.

12. A wide-screen television receiver according to claim 6, wherein said wide cursor adding circuit includes a cursor signal generating circuit for generating a cursor signal by which a part of the image to be displayed is selected, in accordance with the mode which said mode setting circuit has set in said aspect ratio converting circuit, and a luminance reducing circuit for processing the video signal produced from said aspect ratio converting circuit so that the luminance level of the other part of said image is reduced to be lower than that of said part of the image which has been selected by said cursor signal produced from said cursor signal generating circuit.

13. A wide-screen television receiver according to claim 12, further comprising an interpolation circuit which is provided before said aspect ratio converting circuit, said interpolation circuit making interpolation of scan lines for an interlaced scan system video signal supplied thereto so as to convert it into a non-interlaced system video signal and supplying said converted video signal to said aspect ratio converting circuit.

14. A wide-screen television receiver according to claim 6, wherein said wide cursor adding circuit includes a cursor signal generating circuit for generating a cursor signal by which said part of the image to be displayed is selected, in accordance with the mode which said mode setting circuit has set in said aspect ratio converting circuit, and a chrominance signal off circuit for processing the video signal from said aspect ratio converting circuit so as to remove the color of the other part of said image than said part selected by said cursor signal which has been generated from said cursor signal generating circuit.

15. A wide-screen television receiver according to claim 14, further comprising an interpolation circuit which is provided before said aspect ratio converting circuit, said interpolation circuit making interpolation of scan lines for an interlaced scan system video signal supplied thereto so as to convert it into a non-interlaced system video signal and supplying said converted video signal to said aspect ratio converting circuit.

16. A wide-screen television receiver according to claim 6, further comprising an interpolation circuit which is provided before said aspect ratio converting circuit, said interpolation circuit making interpolation of scan lines for an interlaced scan system video signal supplied thereto so as to convert it into a non-interlaced system video signal and supplying said converted video signal to said aspect ratio converting circuit.

17. A wide-screen television receiver capable of receiving a video signal of a first aspect ratio and displaying the image of said video signal on a wide screen of a second aspect ratio larger than said first aspect ratio, comprising:
   a horizontal aspect ratio converting circuit for converting the first aspect ratio of said video signal supplied thereto into said second aspect ratio;
   a vertical magnification circuit for respectively multiplying two vertically adjacent pixels of the image of said video signal supplied thereto from said aspect ratio converting circuit by approximate coefficients of $N/2^n$ and $1-N/2^n$ (n is a positive integer, and $0 \leq N \leq 2^n$) and adding the products to produce interpolation pixels in order to reduce or magnify the image of said video signal in the vertical direction of said wide screen;
   a horizontal magnification circuit for multiplying two horizontally adjacent pixels of the image of said video signal supplied thereto from said vertical magnification circuit by approximate coefficients of $N/2^n$ and $1-N/2^n$ and adding the products to produce interpolation pixels in order to reduce or magnify the image of said video signal in the horizontal direction of said wide screen;
   a mode setting circuit for specifying a part to be reduced or magnified of the image of said video signal and selecting arbitrary magnification powers from various different magnification powers including magnifications necessary for interpolation pixels which cannot be produced by the coefficients of $N/2^n$ and $1-N/2^n$ and other magnifications than $(N+i)/N$ times; and
   a display having said wide screen, whereby all or part of the image of said video signal can be reduced or magnified and displayed on said wide screen.

18. A wide-screen television receiver according to claim 17, further comprising an interpolation processing circuit which is provided before said aspect ratio converting circuit so that said video signal, when it is of the interlaced scan system, is subjected to scan line interpolation processing including inter-field arithmetic operation.

19. A wide-screen television receiver according to claim 17, wherein said N is an arbitrary one of integers 3 to 8.

20. A method of converting an input video signal of a non-wide aspect ratio into a wide aspect ratio video signal and displaying the normal image of said converted video signal of a wide aspect ratio on a wide aspect ratio screen of a television receiver, comprising the steps of:
   displaying the image of said input video signal of a non-wide aspect ratio directly on said screen with said aspect ratio not converted;
   generating a cursor on said screen so as to select part of said displayed image; and
   magnifying said part of image specified by said cursor and displaying said magnified part of image on said screen of said wide aspect ratio.

21. A method according to claim 20, wherein the input video signal and the converted video signal are signals of the same television signal system.

22. A wide-screen television receiver capable of reducing or magnifying a part of a non-wide image to be displayed, so that said part of the image can be displayed on an entire wide screen, comprising:
   an aspect ratio converting circuit having a plurality of display magnification modes, and which, when supplied with an input video signal, converts the time-axis of said input video signal in accordance with the aspect ratio of said wide screen and then magnifies the time-axis converted video signal in accordance with a part to be displayed of an image of said input video signal to thereby convert the aspect ratio of the part to be displayed in accordance with one of said plurality of display magnification modes;
   a mode setting circuit for selecting and setting one of said plurality of display magnification modes; and
   a display having a screen of a wide aspect ratio, wherein an output video signal from said aspect ratio converting circuit is displayed on the entire area of said screen;
   wherein said aspect ratio converting circuit includes:
   a vertical magnification circuit for respectively multiplying two vertically adjacent pixels of the image of said input video signal by approximate coefficients of $N/2^n$ (n is a positive integer, and $0 \leq N \leq 2^n$) and adding the products to produce interpolation pixels in order to reduce or magnify the image of said video signal in the vertical direction of said wide screen; and
   a horizontal magnification circuit for multiplying two horizontally adjacent pixels of the image of said video signal supplied thereto from said vertical magnification circuit by approximately coefficients of $N/2^2$ and $1-N/2^n$ and adding the products to produce interpolation pixels to reduce or magnify the image of said video signal in the horizontal direction of said wide screen.

* * * * *